US012787003B2

(12) United States Patent
Liu et al.

(10) Patent No.: US 12,787,003 B2
(45) Date of Patent: Nov. 3, 2026

(54) DEMODULATION REFERENCE SIGNAL (DMRS) SHARING ACROSS USER EQUIPMENTS (UEs)

(71) Applicant: QUALCOMM Incorporated, San Diego, CA (US)

(72) Inventors: Chih-Hao Liu, San Diego, CA (US); Jing Sun, San Diego, CA (US); Somsubhra Barik, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 18/626,131

(22) Filed: Apr. 3, 2024

(65) Prior Publication Data

US 2025/0317929 A1 Oct. 9, 2025

(51) Int. Cl.

| | |
|---|---|
| ***H04W 72/1273*** | (2023.01) |
| ***H04L 5/00*** | (2006.01) |
| ***H04W 72/0446*** | (2023.01) |
| ***H04W 72/0453*** | (2023.01) |
| ***H04W 72/232*** | (2023.01) |

(52) U.S. Cl.

CPC ....... *H04W 72/1273* (2013.01); *H04L 5/0051* (2013.01); *H04W 72/0446* (2013.01); *H04W 72/0453* (2013.01); *H04W 72/232* (2023.01)

(58) Field of Classification Search

CPC ........... H04W 72/1273; H04W 72/232; H04W 72/0446; H04L 5/0051

See application file for complete search history.

(56) References Cited

U.S. PATENT DOCUMENTS

2017/0353947 A1* 12/2017 Ang ...................... H04L 5/0048
2020/0153591 A1* 5/2020 Ly ......................... H04L 5/0091
2020/0178287 A1* 6/2020 Kim ...................... H04W 72/23
2020/0296747 A1* 9/2020 Kim ...................... H04L 5/0053
2020/0314727 A1* 10/2020 Xu ......................... H04L 47/32
2021/0212032 A1* 7/2021 Lee ....................... H04L 5/0044

(Continued)

FOREIGN PATENT DOCUMENTS

WO WO-2023211965 A1 * 11/2023 ......... H04L 25/0224

OTHER PUBLICATIONS

3GPP TS 38.211: "3rd Generation Partnership Project, Technical Specification Group Radio Access Network, NR, Physical Channels and Modulation (Release 18)", 3GPP TS 38.211, V18.1.0, Dec. 2023, pp. 1-159.

(Continued)

*Primary Examiner* — Kenny S Lin
(74) *Attorney, Agent, or Firm* — Dinsmore & Shohl LLP

(57) ABSTRACT

Certain aspects of the present disclosure provide techniques for sharing demodulation reference signals (DMRSs) across user equipments (UEs). A method generally includes receiving an indication to buffer first information associated with one or more first DMRSs that are scheduled in a first physical downlink shared channel (PDSCH) for a first UE, receiving, in the first PDSCH, the one or more first DMRSs; buffering the first information associated with the one or more first DMRSs; receiving a second PDSCH scheduled for the apparatus, and performing channel estimation to decode the second PDSCH based on one or more of: the first information; or one or more second DMRSs received in the second PDSCH.

30 Claims, 12 Drawing Sheets

(56) References Cited

U.S. PATENT DOCUMENTS

| | | | | |
|---|---|---|---|---|
| 2021/0243703 | A1* | 8/2021 | Wolf | H04L 5/0094 |
| 2021/0367732 | A1* | 11/2021 | Salim | H04L 5/0044 |
| 2023/0006873 | A1* | 1/2023 | Zhang | H04L 5/0048 |
| 2023/0045947 | A1* | 2/2023 | Elshafie | H04L 1/0003 |
| 2023/0111781 | A1* | 4/2023 | Sakhnini | H04L 5/0051<br>370/329 |
| 2023/0164805 | A1* | 5/2023 | Matsumura | H04W 72/30<br>370/329 |
| 2023/0224120 | A1* | 7/2023 | Tian | H04L 5/0094<br>370/329 |
| 2024/0007236 | A1* | 1/2024 | Manolakos | G01S 7/006 |
| 2025/0016617 | A1* | 1/2025 | Zewail | H04L 1/0072 |
| 2025/0119925 | A1* | 4/2025 | Zewail | H04L 5/0023 |
| 2025/0274311 | A1* | 8/2025 | Liu | H04L 25/0228 |

OTHER PUBLICATIONS

3GPP TS 38.212: "3rd Generation Partnership Project, Technical Specification Group Radio Access Network, NR, Multiplexing and Channel Coding (Release 18)", 3GPP TS 38.212, V18.1.0, Dec. 2023, pp. 1-293.

3GPP TS 38.213: "3rd Generation Partnership Project, Technical Specification Group Radio Access Network, NR, Physical Layer Procedures for Control (Release 18)", 3GPP TS 38.213, V18.1.0, Dec. 2023, pp. 1-300.

* cited by examiner

DEMODULATION REFERENCE SIGNAL (DMRS) SHARING ACROSS USER EQUIPMENTS (UEs)

BACKGROUND

Field of the Disclosure

Aspects of the present disclosure relate to wireless communications, and more particularly, to techniques for sharing demodulation reference signals (DMRSs) across user equipments (UEs).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes receiving an indication to buffer first information associated with one or more first demodulation reference signals (DMRSs) that are scheduled in a first physical downlink shared channel (PDSCH) for a first user equipment (UE); receiving, in the first PDSCH, the one or more first DMRSs; buffering the first information associated with the one or more first DMRSs; receiving a second PDSCH scheduled for the apparatus; and performing channel estimation to decode the second PDSCH based on one or more of: the first information; or one or more second DMRSs received in the second PDSCH.

Another aspect provides a method for wireless communications by an apparatus. The method includes sending, to at least a first UE, an indication to buffer first information associated with one or more first DMRSs that are scheduled in a first PDSCH for a second UE; sending the first PDSCH for the second UE; and sending a second PDSCH for the first UE.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
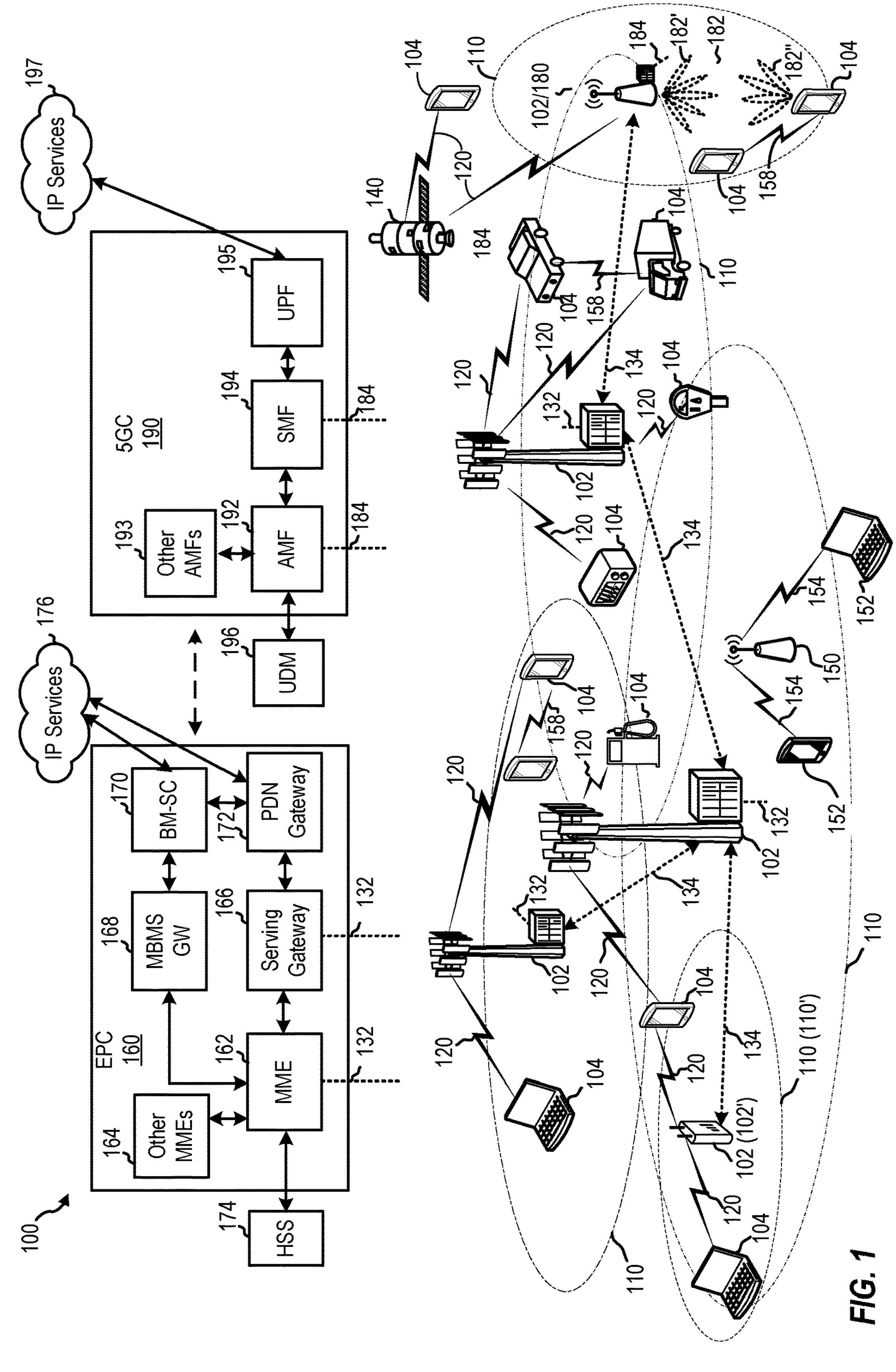
FIG. 1 depicts an example wireless communications network.

Aspects of the present disclosure provide apparatuses, methods, processing systems, and computer-readable mediums for sharing demodulation reference signals (DMRSs) across user equipments (UEs).

In wireless communications networks, a physical downlink shared channel (PDSCH) may be used for carrying user data from a network entity (e.g., such as a base station (BS)) to a UE. To facilitate accurate demodulation and decoding of the PDSCH at the UE, DMRS(s) may be employed.

A DMRS is a special type of physical layer signal that may be transmitted on specific resource elements within downlink and/or uplink time-frequency grids. A DMRS may function as a reference signal to aid channel estimation, as well as demodulation and/or decoding of a data signal. For example, DMRS-based channel estimation is a pilot-based approach (e.g., a method in which predefined reference signals, referred to as "pilots," are transmitted along with data to obtain channel knowledge for proper decoding of received signals) used to estimate channel coefficients by exploiting known properties of a DMRS signal. A receiver of the DMRS may use the channel coefficients to extract information from a received data signal transmitted over the channel. For example, in the downlink, a DMRS provides a reference signal that may help a UE accurately estimate channel conditions on the PDSCH for demodulating and/or decoding a received downlink data signal. As such, the use of DMRS(s) may help contribute to the overall reliability and performance of wireless communications networks.

In some cases, each PDSCH communication may include DMRS(s) that carry information used to estimate the radio channel for demodulation and/or decoding at the UE. The PDSCH communication may further include data. Including DMRS(s) in every PDSCH (or every two PDSCHs), however, may lead to unnecessary signaling overhead, especially in scenarios where narrow bands are used (e.g., resulting in more frequent transmission of DMRSs within PDSCH communications). This superfluous signaling of DMRSs may have a negative impact on network performance.

As such, in some cases, DMRS sharing across PDSCH communications, directed to a same UE, may be used. For example, a UE may leverage DMRS(s) from a first PDSCH communication scheduled for the UE to demodulate and/or decode a second PDSCH communication scheduled for the UE and sent to the UE later in time (e.g., sent to the UE in a later time transmission interval (TTI), where a TTI refers to a duration of time in which a network entity is capable of scheduling any user for uplink or downlink communication). For instance, the second PDSCH communication may not include any DMRSs. Instead, DMRS information for the DMRS(s) associated with the first PDSCH communication may be buffered and reused to facilitate demodulating and/or decoding of the second PDSCH communication. For example, the DMRS information may include a channel estimate and/or be used to determine a channel estimate for the PDSCH, and the UE may use the channel estimate to demodulate and/or decode the second PDSCH communication.

As used herein, "buffering" DMRS information may refer to (1) saving and/or storing the DMRS information in a region of memory used for temporary data storage (e.g., a buffer) and/or (2) indexing (e.g., associating one or more indexes with) the DMRS information. In the context of buffering DMRS information, information associated with a DMRS may include the DMRS itself, a time domain transformation of the DMRS, a channel estimation output based on the DMRS, a weighted average of one or more channel estimation outputs, and/or other information determined based on mathematical and/or signal processing operation(s) applied to the DMRS, among other examples. For example, information associated with a DMRS may include characteristic(s) of the DMRS such as, a code sequence, a transmission configuration indicator (TCI) state, a waveform parameter value (e.g., frequency, amplitude, phase, etc.), and/or a DMRS identifier (ID), among other examples.

DMRS sharing across PDSCH communications may support sparse DMRS inclusion in downlink data transmissions. Sparse DMRS inclusion may beneficially reduce signaling overhead and/or improve processing speed at a UE, which may positively impact overall network performance.

While DMRS sharing techniques across PDSCH communications provide the aforementioned technical benefits, such techniques are not without limitations. For example, a technical challenge associated with DMRS sharing includes the ability of a UE to leverage DMRS(s), included in a PDSCH communication scheduled for another UE in a first TTI, for demodulating and/or decoding a PDSCH scheduled for the UE in a second TTI. The second TTI may be later in time than the first TTI.

For example, to leverage DMRS(s) included in a first PDSCH communication for demodulating and/or decoding a second PDSCH communication (e.g., where the second PDSCH communication is sent later in time than the first PDSCH communication), a UE may need to (1) locate the DMRS(s) in the previous PDSCH communication and (2) buffer DMRS information for the DMRS(s). Generally, a UE may use information included in a DCI scheduling the first PDSCH communication including the DMRS(s), such as resource allocation information for the DMRS(s) in the first PDSCH communication among other information, to perform both of these tasks. In cases where the first PDSCH communication is scheduled for another UE, however, the DCI scheduling the first PDSCH may also be scheduled for the other UE and may not be decodable by the UE. For example, the DCI scheduling the first PDSCH communication may be scrambled with a radio network temporary identifier (RNTI) associated with the other UE and unknown by the UE for decoding the DCI. As such, the DMRS allocation in the first PDSCH may be unknown to the UE and buffering of DMRS information for these DMRS(s) may not be feasible without this information.

Alternatively, in some cases, a UE may perform frequency domain (FD) in-phase, Quadrature (IQ) sampling to buffer DMRS(s) included in PDSCH communication(s) scheduled for other UE(s) in different TTIs. Buffer size at the UE may present a technical challenge for such FD IQ sampling techniques, however. For example, a UE may not be able to store all FD IQ samples in the buffer while waiting for a grant indicating that the UE is to leverage DMRS(s)

from previous PDSCH communication(s) for demodulating and/or decoding an upcoming PDSCH communication scheduled for the UE.

Accordingly, techniques for DMRS sharing across UEs suffer from the aforementioned technical deficiencies, which hampers their use for improved network performance.

Embodiments described herein may overcome the above-described technical challenges associated with DMRS sharing and may improve upon the state of the art by introducing techniques for buffering DMRSs included in PDSCH communications scheduled for different UEs. For example, to enable a first UE to locate and buffer DMRS(s) included within a first PDSCH communication scheduled for a second UE, techniques described herein may rely on additional layer 1 (L1) control signaling, such as the transmission of downlink control information (DCI), between a network entity scheduling the first PDSCH communication for the second UE and the first UE. Transmission of the DCI to the first UE may be used to instruct the first UE to exploit DMRS(s) included in the first PDSCH communication scheduled for the second UE. For example, the DCI may include an indication instructing the first UE to buffer DMRS information for DMRS(s) included in the first PDSCH communication. The buffered DMRS information may include (1) the DMRS(s) themselves, which may be used to estimate the channel and/or (2) a channel estimate based on the DMRS(s). This buffered DMRS information may be used to perform channel estimation to demodulate and/or decode a second PDSCH communication scheduled for the first UE in a TTI later in time than a TTI used for transmitting the first PDSCH communication to the second UE. In certain aspects, the second PDSCH communication scheduled for the first UE may not include any DMRS(s) to reduce signaling overhead and UE processing latency, thereby improving overall network performance. Thus, this buffered DMRS information may facilitate demodulating and/or decoding the second PDSCH communication. In certain other aspects, the second PDSCH communication scheduled for the first UE may include one or more DMRS(s). Thus, this buffered DMRS information may supplement and be used in combination with the DMRS(s) in the second PDSCH communication to perform channel estimation and decode the second PDSCH communication scheduled for the first UE.

In certain aspects, the DCI may be a UE-specific DCI intended for only the first UE (e.g., a UE capable of performing channel estimation based on DMRS(s) included in a PDSCH scheduled for another UE). In certain other aspects, the DCI may be a group common-DCI (GC-DCI) intended for a (e.g., preconfigured) group of UEs, including the first UE. Further, in certain aspects, the DCI may be a GC-DCI intended for a subgroup of UEs belonging to a larger (e.g., preconfigured) group of UEs, including the first UE. For example, a subgroup of UEs may be selected for receiving the GC-DCI based on a precoder applied to PDSCH communications scheduled for each UE in the subgroup being the same precoder applied to DMRS(s) that the GC-DCI indicates the subgroup of UEs should exploit for later channel estimation.

In certain aspects, the DCI may include information that may be used by the first UE to locate the DMRS(s) in the first PDSCH. This information may be useful for buffering the DMRS information for the DMRS(s) included in the first PDSCH communication at the first UE. In certain aspects, the information may include a frequency domain resource allocation (FDRA) for the first PDSCH communication, which may be used by the first UE to determine the frequency resources scheduled for transmitting the DMRS(s). In certain aspects, the information may include a start and length indicator value (SLIV) indicating a time domain resource allocation (TDRA) for the first PDSCH, which may be used for determining a number of DMRSs and a location of each DMRS included in the first PDSCH. In certain aspects, the information may include an indication that DMRS parameter(s) for the DMRS(s) included in the first PDSCH are UE-specific or cell-specific. In either case, one or more DMRS parameters may also be included in the DCI.

As such, the additional L1 control signaling, e.g., the UE-specific DCI and/or GC-DCI, introduced in embodiments described herein beneficially aids the first UE in determining when to buffer DMRS(s) included in a PDSCH communication intended for another UE. Further, the additional L1 signaling beneficially enables a UE to buffer the DMRS(s) based on including information about a DMRS resource allocation for the DMRS(s) included in the PDSCH communication. For example, instead of decoding a DCI scheduling the PDSCH communication for the other UE (which may not be feasible), to obtain information about the DMRS(s) included in the PDSCH communication, the UE may decode the UE-specific DCI and/or GC-DCI to obtain similar information. The UE may use this information to determine when DMRS(s) are scheduled for buffering, such that the UE may later use this information to decode a PDSCH communication scheduled for the UE. The ability to utilize DMRS(s) scheduled for other UEs may allow for sparser DMRS transmission to the first UE, thereby contributing to increasing processing speed at the first UE, as well as reduced signaling overhead thus, leading to improved overall network performance.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects (also referred to herein as non-terrestrial network entities), such as ground-based network entities (e.g., BSs 102), and non-terrestrial aspects, such as satellite 140 and/or aerial or spaceborne platform(s), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms “cell” or “serving cell” may refer to or correspond to a specific carrier frequency (e.g., a component carrier) used for wireless communications, and a “cell group” may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
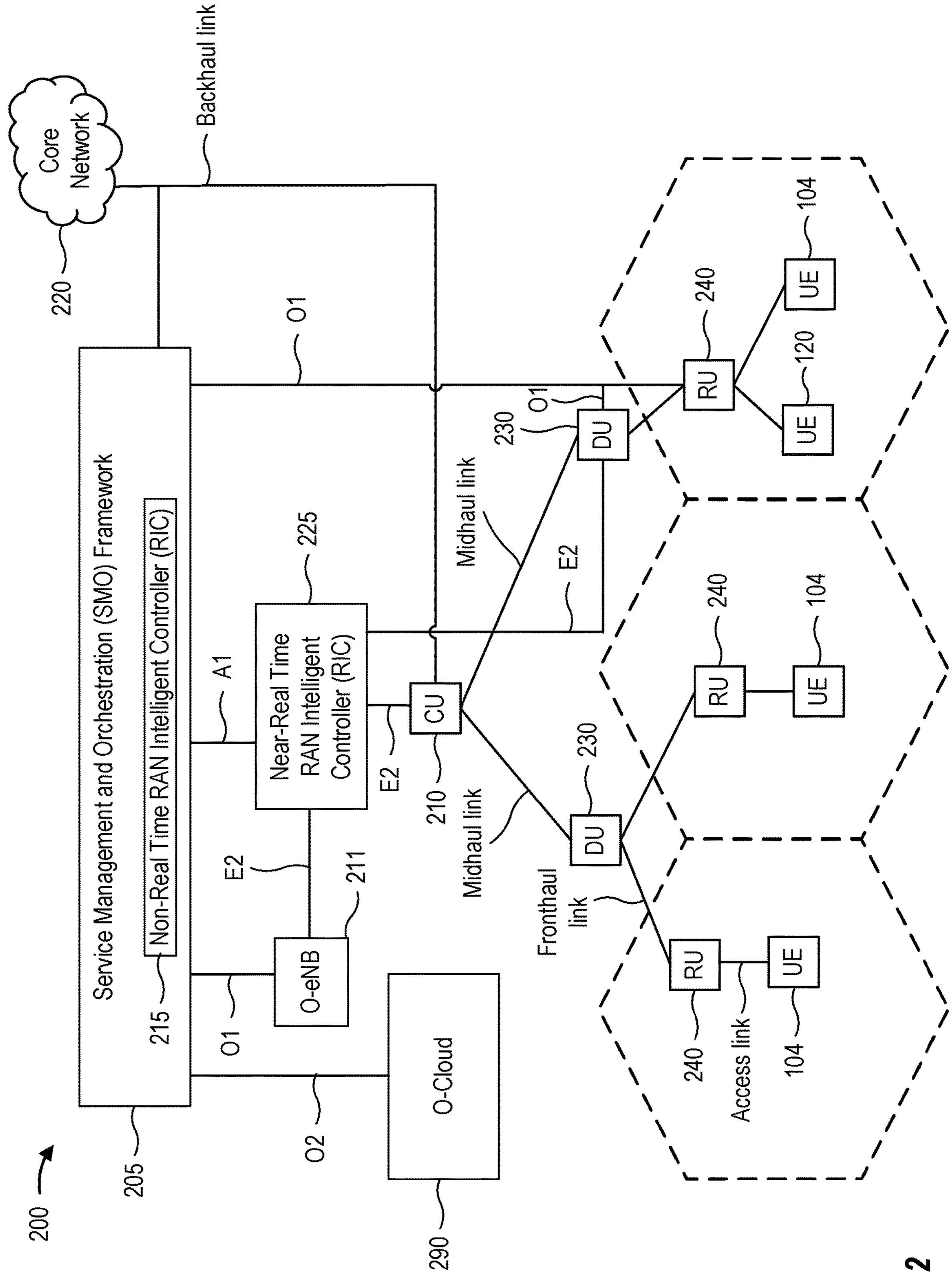
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as “Sub-6 GHz”. Similarly, 3GPP currently defines Frequency Range 2 (FR2) as including 24,250 MHz-71,000 MHZ, which is sometimes referred to (interchangeably) as a “millimeter wave” (“mmW” or “mmWave”). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
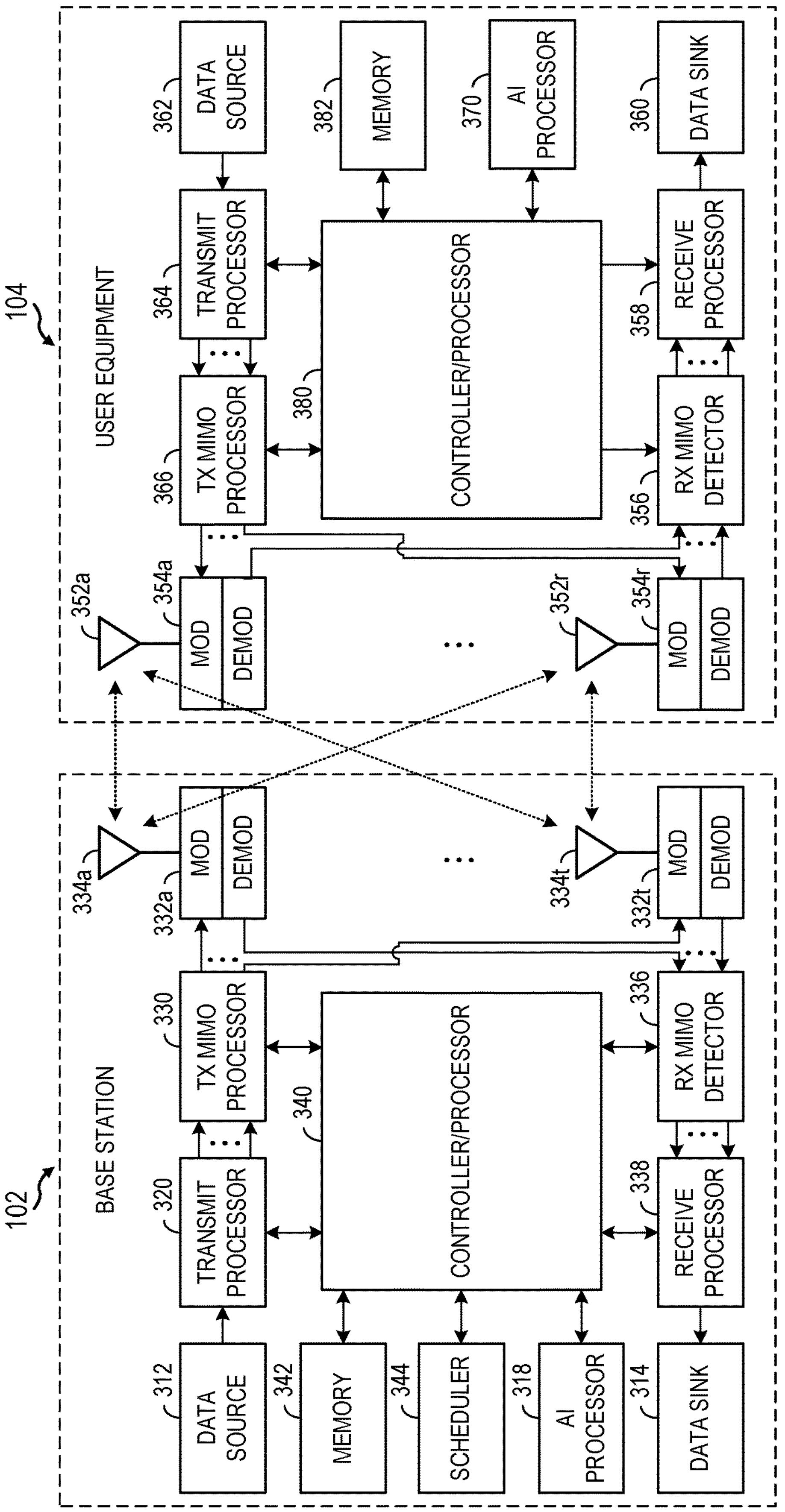
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications. Note that the BS 102 may have a disaggregated architecture as described herein with respect to FIG. 2.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning prediction). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
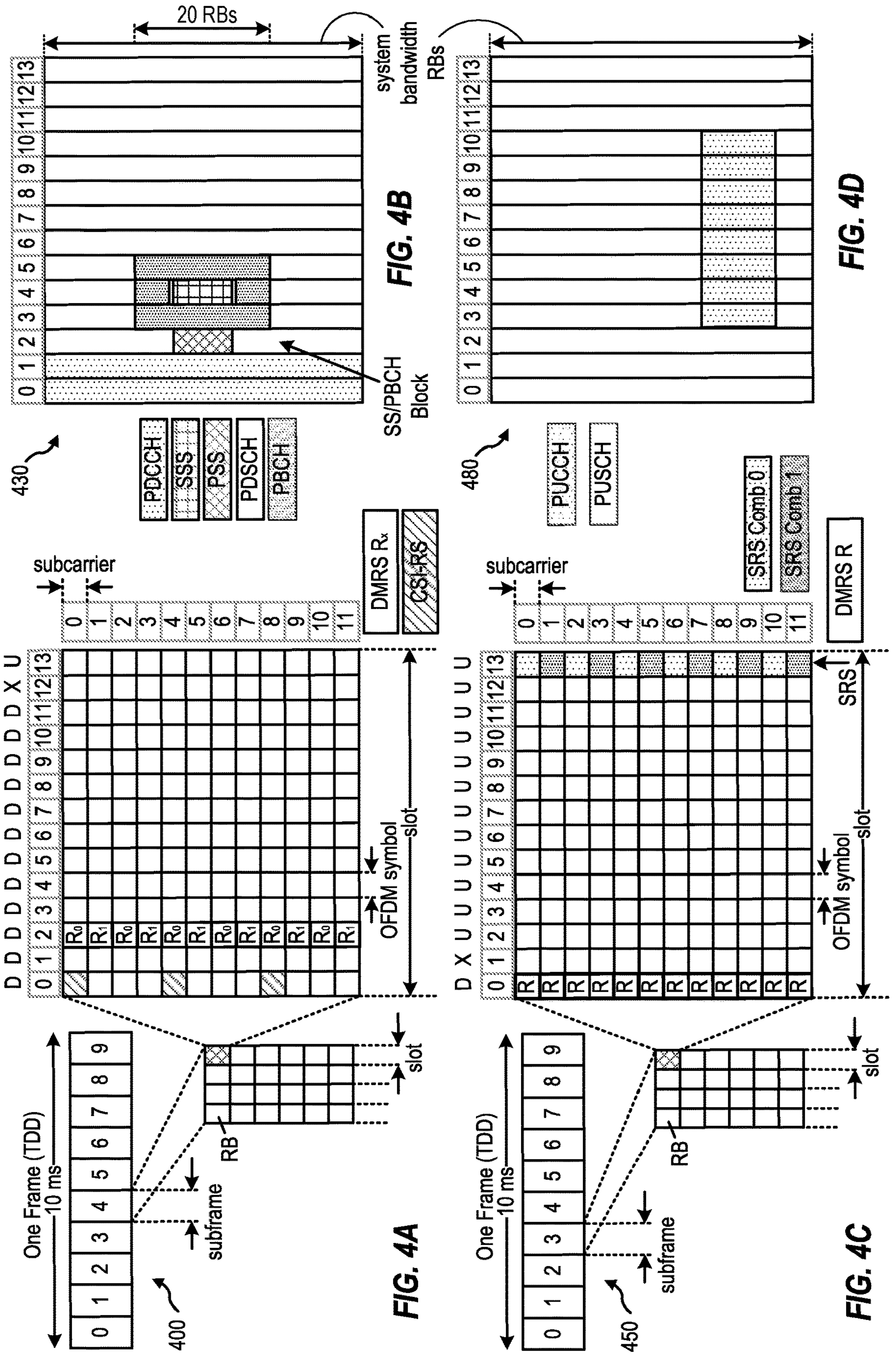
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology μ, there are $2^{\mu}$ slots per subframe. Thus, numerologies (μ) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times$ 15 kHz, where μ is the numerology 0 to 6. As an example, the numerology μ=0 corresponds to a subcarrier spacing of 15 kHz, and the numerology μ=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology μ=2 with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to DMRS Sharing

Figure 5:
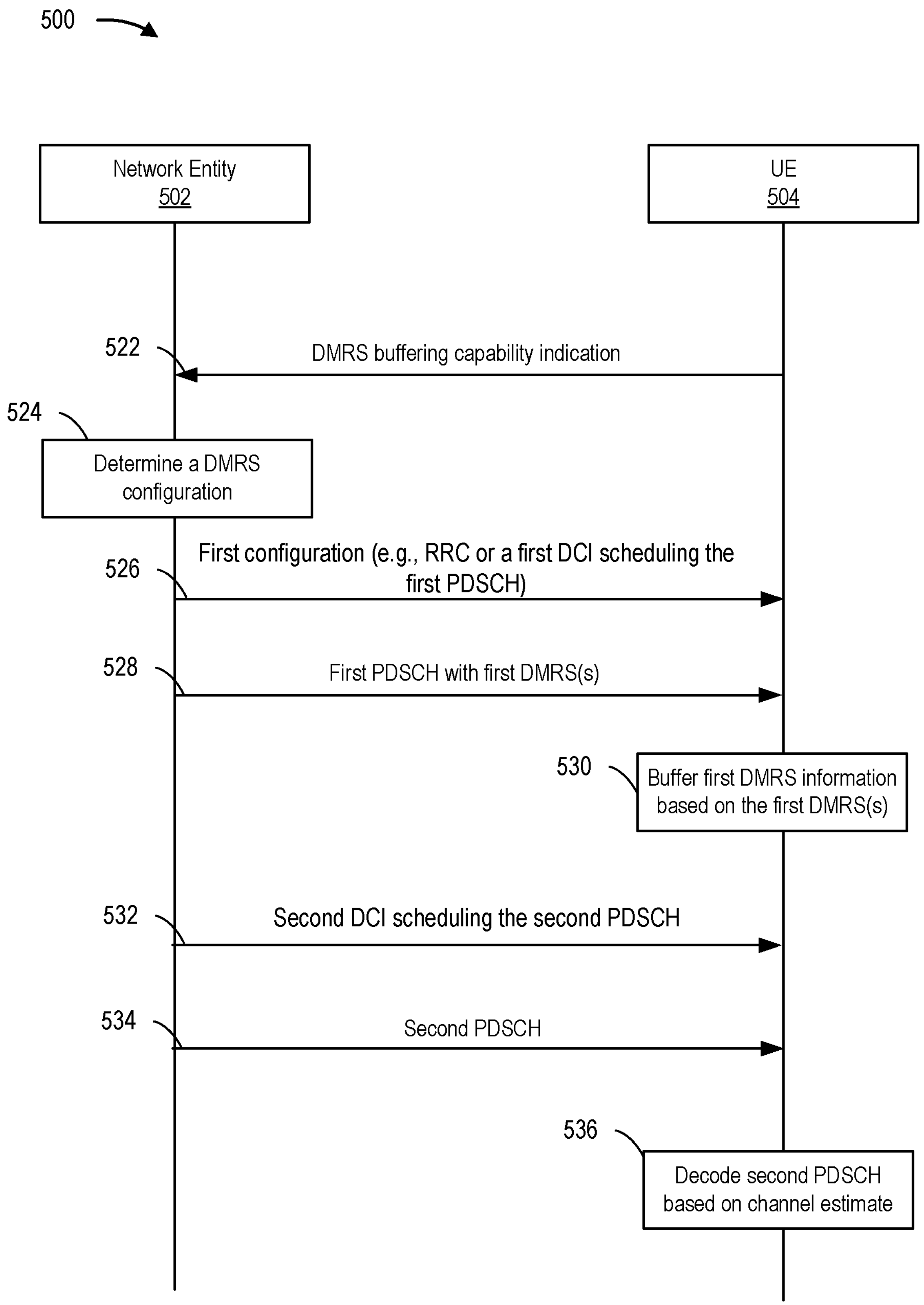
FIG. 5 depicts a process flow for communications in a network between a network entity and a UE for demodulation reference signal (DMRS) sharing.

FIG. 5 depicts a process flow 500 for communications in a network between a network entity 502 and a UE 504 for DMRS sharing. In certain aspects, the network entity 502 may be an example of the BS 102 depicted and described with respect to FIGS. 1 and 3 or a disaggregated base station depicted and described with respect to FIG. 2. Similarly, the UE 504 may be an example of UE 104 depicted and described with respect to FIGS. 1 and 3. However, in other aspects, UE 504 may be another type of wireless communications device and network entity 502 may be another type of network entity or network node, such as those described herein.

Process flow 500 begins, at 522, with UE 504 sending and network entity 502 receiving, a DMRS buffering capability indication. The DMRS buffering capability indication may indicate a capability of UE 504 to buffer information associated with DMRSs ("DMRS information").

In certain aspects, the DMRS buffering capability indication may further indicate an amount of DMRS information that UE 504 is capable of buffering. In certain aspects, the amount of DMRS information that UE 504 is capable of buffering may be indicated in terms of memory capacity. In certain aspects, the amount of DMRS information that UE 504 is capable of buffering may be indicated for DMRSs having one or more specified configuration attributes (e.g., buffering capability for full-band DMRSs (e.g., DMRSs that span a bandwidth part (BWP)), buffering capability for DMRSs with a specific rank, etc.).

Network entity 502 may use the DMRS buffering capability indication to determine, at 524, a DMRS configuration for sending DMRS(s) to UE 504. For example, in certain aspects, network entity 502 may determine that UE 504 is to use DMRS sharing based on receiving the DMRS buffering capability indication from UE 504. Thus, network entity 502 may determine that DMRSs associated with one or more PDSCHs, sent to UE 504, are to be reused for demodulating and/or decoding a PDSCH sent to UE 504 later in time. For example, network entity 502 may determine that UE 504 is to buffer DMRS information associated with the earlier transmitted DMRS(s) and use this DMRS information to facilitate reception of a downlink data signal transmitted later in time. As such, in certain aspects, transmission of DMRS(s) with the later transmitted downlink data signal may not be needed, thereby reducing signaling and processing overhead.

Process flow 500 then proceeds, at 526, with network entity 502 sending, and UE 504 receiving, a first configuration. The first configuration may be associated with a first PDSCH that includes one or more first DMRSs (e.g., sent at 528, as described below). In certain aspects, the first configuration is sent, at 526, via a DCI scheduling the first PDSCH. In certain aspects, the first configuration is sent, at 526, via radio resource control (RRC) signaling.

In certain aspects, the first configuration may include a DMRS sharing indication. The DMRS sharing indication may be based on the DMRS configuration determined at 524. The DMRS sharing indication may indicate that DMRS(s) associated with one or more PDSCH are to be reused for demodulating and decoding a PDSCH sent to UE 504 later in time.

In certain aspects, the DMRS sharing indication may further include a DMRS lifespan parameter value that indicates a configurable DMRS lifespan of the DMRS information buffered for DMRS(s) that UE 504 is indicated to buffer. The lifespan of a DMRS may be a time period during which the DMRS information associated with the DMRS may be reused for receiving shared channel communications. In certain aspects, the lifespan may be indicated in terms of raw time measurement (e.g., milliseconds (ms), seconds(s), etc.), in terms of time domain resources (e.g., symbols, subslots, and/or slots), and/or in terms of one or more channel and/or device conditions, among other examples. In certain other aspects, a DMRS lifespan parameter value may indicate that a DMRS is not to be reused (e.g., by indicating a lifespan of zero).

For the example depicted in FIG. 5, the DMRS sharing indication may indicate that UE 504 is to buffer DMRS information associated with DMRS(s) associated with a first PDSCH scheduled for UE 504 and use this DMRS information to facilitate reception of a second PDSCH also scheduled for UE 504 and scheduled to be sent later in time than the first PDSCH.

Process flow 500 proceeds, at 528, with network entity 502 sending, and UE 504 receiving, the first PDSCH. The first PDSCH may include first DMRS(s). For example, in certain aspects, the first DMRS(s) may be based on the DMRS configuration determined at 524. At 530, UE 504 buffers first DMRS information associated with the first DMRS(s) based on the DMRS sharing indication included in the first configuration received by UE 504 at 526.

Process flow 500 proceeds, at 532, with network entity 502 sending, and UE 504 receiving, a second DCI scheduling the second PDSCH for UE 504. In certain aspects, the second DCI may indicate which DMRS(s) (e.g., which DMRS information associated with these DMRS(s)) are to be used for demodulating and/or decoding the second PDSCH. In this example, the second DCI may indicate that UE 504 is to use the DMRS information buffered for first DMRS(s) in the first PDSCH, at 530.

Thus, at 534, network entity 502 sends, and UE 504 receives, the second PDSCH. The second PDSCH may not include any DMRS(s). Receiving the second PDSCH may include detecting the second PDSCH, demodulating the second PDSCH, transforming the second PDSCH from a time domain to a frequency domain (or vice-versa), and/or decoding the second PDSCH, among other examples.

In certain aspects, the second PDSCH may not include any DMRS(s). As such, UE 504 may receive the second PDSCH based on the first DMRS(s) by demodulating and/or decoding the communication based on the first DMRS information buffered for the first DMRS(s) at 530. For example, in cases where the buffered first DMRS information includes the first DMRS(s) themselves, UE 504 may estimate the (e.g., propagation) channel based on the first DMRS information and use the estimated channel to facilitate demodulating and/or decoding of the second PDSCH, at 536. As another example, in cases where the buffered first DMRS information includes a channel estimate based on the first DMRS(s), UE 504 may use the buffered channel estimate to facilitate demodulating and/or decoding of the second PDSCH.

In certain aspects, the second PDSCH may include second DMRS(s). Accordingly, UE 504 may receive the second PDSCH based on the first DMRS(s) in the first PDSCH and the second DMRS(s) in the second PDSCH. For example, UE 504 may use the buffered first DMRS information for the first DMRS(s) and the second DMRS(s) to obtain a potentially better channel estimate than if only the first DMRS information was used. This estimated channel may then be used to facilitate demodulating and/or decoding of the second PDSCH.

Figure 6:
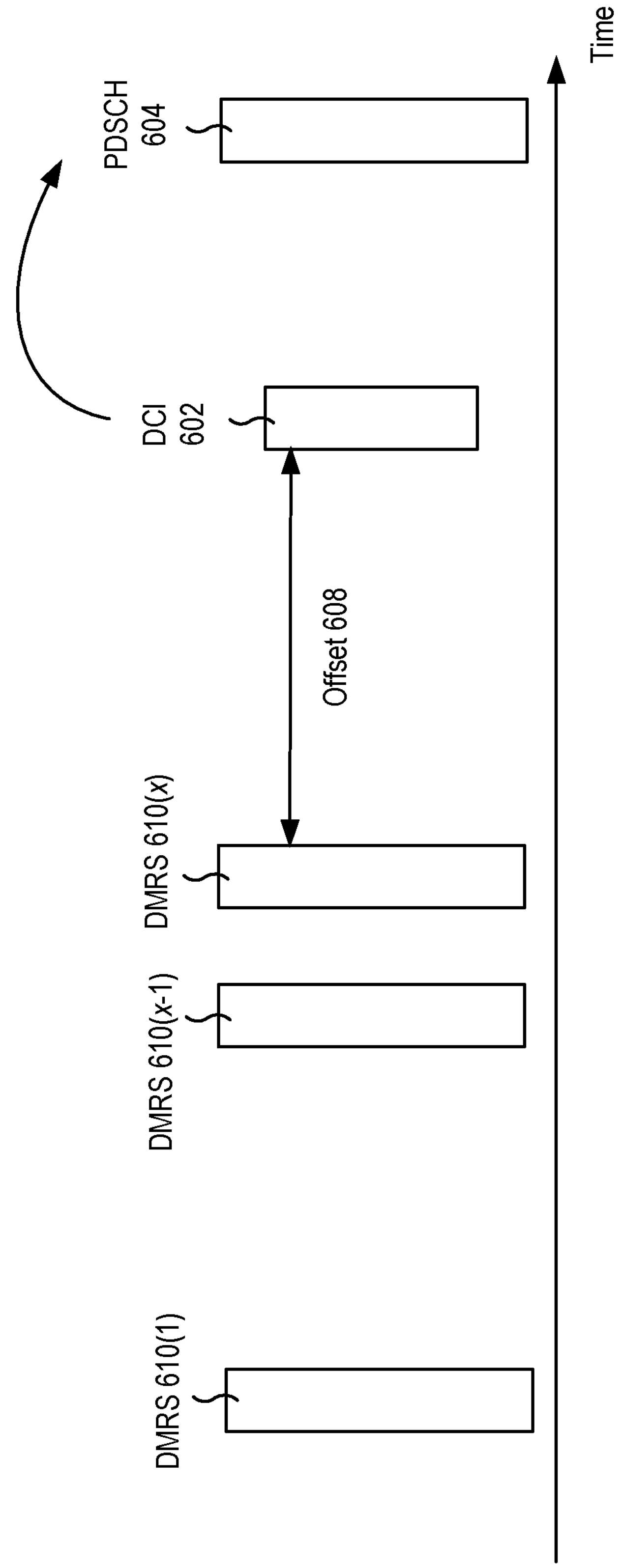
FIG. 6 depicts application of a slot offset for determining a DMRS, and more specifically buffered DMRS information associated with the DMRS, to use for receiving a downlink data transmission.

FIG. 6 depicts an example application of an offset for determining a DMRS, and more specifically buffered DMRS information associated with the DMRS, to use for receiving a downlink data transmission. As described herein, in certain aspects, DCI ("scheduling DCI") scheduling a PDSCH ("scheduled PDSCH") may include an indication of DMRS(s) to use for demodulating and/or decoding the scheduled PDSCH. In certain aspects, as shown in FIG. 6, the indication may be provided by including an indication of an offset 608 in the scheduling DCI.

For example, a UE (not shown in FIG. 6) (e.g., such as UE 104 described above with respect to FIGS. 1 and 3) may receive a number of downlink data communications (e.g., PDSCHs), each including one or more DMRSs, such as DMRS 610(1), . . . . DMRS 610($x$−1), DMRS 610($x$) (e.g., where x is an integer greater than one) (collectively referred to herein as "DMRSs 610" and individually referred to herein as "DMRS 610") and may buffer the respective DMRSs 610. In certain aspects, the UE may index the DMRSs 610 by assigning a DMRS index to each DMRS 610, by associating a slot number with each DMRS 610, and/or by associating a reception time with each DMRS 610, among other examples.

After receiving DMRS 610($x$), the UE may receive a DCI 602. DCI 602 may be a scheduling DCI scheduling PDSCH 604. In certain aspects, DCI 602 may include an indication of an offset 608. Offset 608 may indicate one or more target DMRSs (e.g., DMRS 610($x$)) to use for demodulating and/or decoding PDSCH 604 (e.g., scheduled by DCI 602) by representing an offset between a reference slot and a target slot. The target slot may be a slot where the target DMRS(s)

are received. The reference slot may be a slot where DCI 602 is received. For example, in FIG. 6, offset 608 may indicate to use DMRS 610(*x*) (e.g., the target DMRS) for demodulating and/or decoding PDSCH 604.

In certain aspects, offset 608 is a backwards-looking offset. For example, offset 608 may indicate the oldest buffered DMRS that can be used for demodulating and/or decoding PDSCH 604 from the reference slot where DCI 602, including offset 608, is received.

In certain aspects, offset 608 may be based on DMRS 610(*x*) having a same DMRS configuration as the scheduling DCI. In certain aspects, offset 608 may be based on a DMRS reuse indication sent to the UE (e.g., such as in the first configuration sent to UE 504 in FIG. 5).

DMRS sharing across PDSCH communications scheduled for a same UE, as described and depicted with respect to FIGS. 5 and 6, may help to facilitate faster processing times at the UE (e.g., based on the UE processing less DMRSs) and/or reduced signaling overhead (e.g., due to reduced (e.g., in some cases, sparse) DMRS inclusion in PDSCH communications). As such, DMRS sharing may have a positive impact on network performance. Realization of these technical benefits, however, may be limited to cases where DMRS sharing is across PDSCH communications scheduled for a same UE. For example, a technical challenge associated with DMRS sharing includes the ability of a UE to leverage DMRS(s), included in a PDSCH communication scheduled for another UE in a first TTI, for demodulating and/or decoding a PDSCH scheduled for the UE in a second TTI. The second TTI may be later in time than the first TTI.

For example, to exploit DMRS(s) included in a PDSCH communication for subsequent channel estimation, demodulation, and/or decoding, a UE may need to determine a resource allocation for the DMRS(s) in the PDSCH communication. The resource allocation may help the UE determine a number of DMRSs included in the PDSCH communication, as well as a location of each DMRS for buffering. In certain aspects, this resource allocation information is included in a DCI scheduling the first PDSCH communication including the DMRS(s). In cases where the first PDSCH is a PDSCH communication scheduled for the UE, the DCI scheduling the first PDSCH communication may be decodable by the UE. In cases where the first PDSCH is scheduled for another UE, however, the DCI scheduling the first PDSCH may also be scheduled for the other UE and may not be decodable by the UE. For example, the DCI scheduling the first PDSCH communication may be scrambled with an RNTI associated with the other UE. This RNTI may be unknown by the UE, and thus, the UE may not be able to decode the DCI including the resource allocation information. Without this information, buffering of DMRS information for DMRS(s) included in the first PDSCH communication may not be feasible. Accordingly, DMRS sharing may not be utilized.

Alternatively, in some cases, a UE may perform FD IQ sampling to buffer DMRS(s) included in PDSCH communication(s) scheduled for other UE(s) in different TTIs. Storing all FD IQ samples in a buffer while waiting for a grant to leverage one or more of the DMRS(s), however, may not be feasible due to resource and/or size limitations of the buffer.

Aspects Related to DMRS Sharing Across UEs

Aspects described herein overcome the aforementioned technical problems and improve upon the state of the art by introducing techniques that allow for DMRS sharing across UEs. For example, aspects described herein introduce additional L1 control signaling that may be used to enable a first UE, scheduled to receive a first PDSCH communication, to exploit DMRS(s) included in PDSCH communication(s) scheduled for other UE(s) earlier in time (e.g., PDSCH communication(s) transmitted in TTI(s) earlier in time than a TTI where the first PDSCH communication is transmitted). The additional L1 control signaling, described herein, may comprise additional DCI transmitted to the UE. In certain aspects, the DCI may include an indication, instructing the first UE, to buffer DMRS information associated with one or more DMRSs scheduled in PDSCH(s) for one or more other UEs. Further, in certain aspects, the additional L1 control signaling may include information useful for locating the DMRS(s) and buffering DMRS information associated with the DMRS(s) for subsequent channel estimation to decode the first PDSCH.

In certain aspects, the DCI is a UE-specific DCI intended for the first UE. In certain aspects, the DCI is a group common-DCI (GC-DCI) intended for a group of UEs including the first UE.

Figure 7:
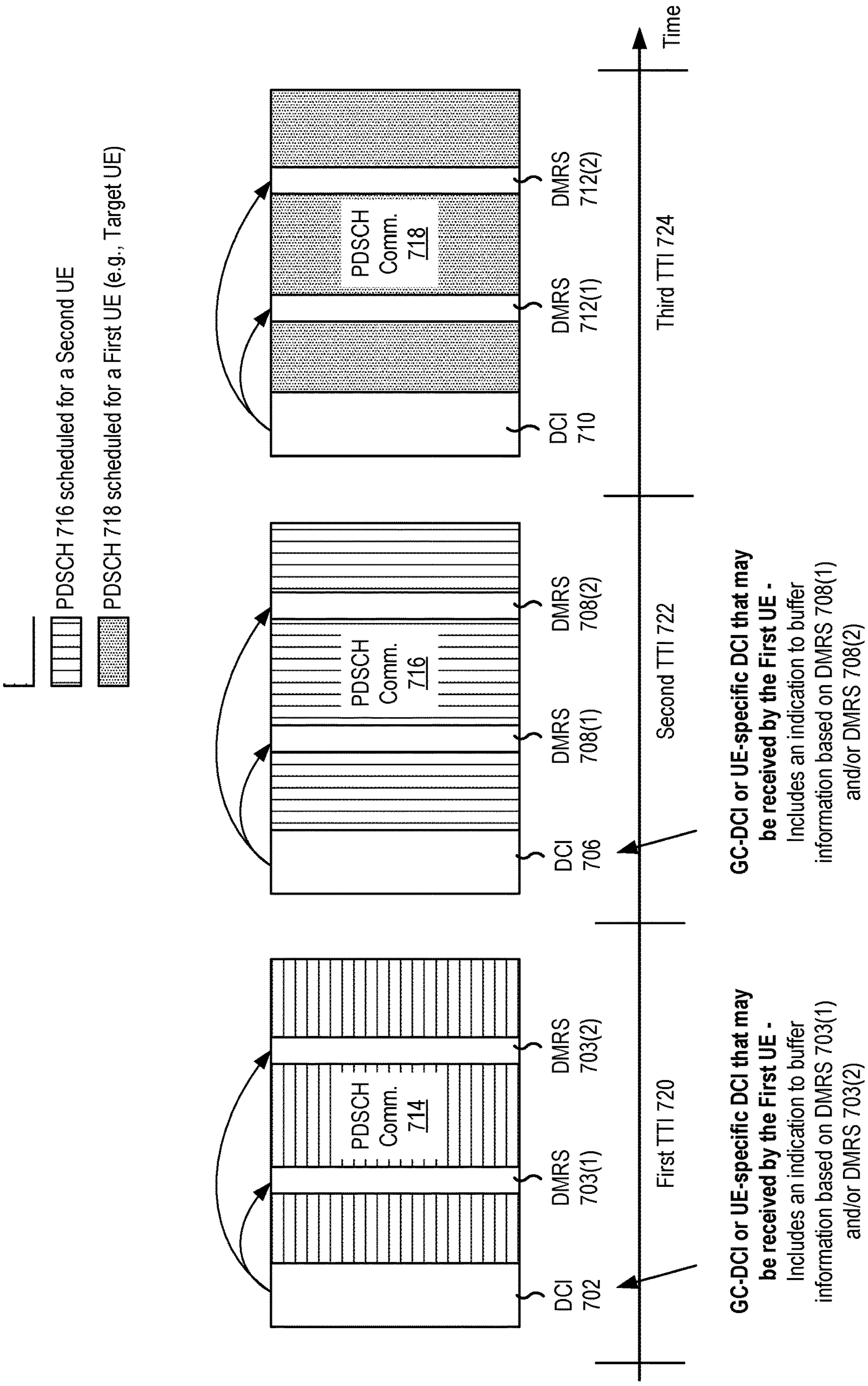
FIG. 7 depicts example signaling used to enable DMRS sharing across UEs for DMRSs included in PDSCH communications transmitted in different transmission time intervals (TTIs).

FIG. 7 depicts example signaling used to enable DMRS sharing across UEs for DMRSs included in PDSCH communications transmitted in different TTIs. As shown, (1) a first PDSCH communication 714 is scheduled, in a first TTI 720, for a third UE, (2) a second PDSCH communication 716 is scheduled, in a second TTI 722, for a second UE, and (3) a third PDSCH communication 718 is scheduled, in a third TTI 724, for a the first UE. The third UE, the second UE, and the first UE may each be an example of UE 104 depicted and described with respect to FIGS. 1 and 3.

Two DMRSs 703(1), 703(2) may be scheduled in first PDSCH communication 714. Two DMRSs 708(1), 708(2) may be scheduled in second PDSCH communication 716. Further, two DMRSs 712(1), 712(2) may be scheduled in third PDSCH communication 718. Although two DMRSs are scheduled in each PDSCH communication illustrated in FIG. 7, in some other example, more or less DMRSs may be scheduled in each PDSCH communication, and the number of DMRSs scheduled per PDSCH communication may vary.

In this example, the first UE may be a target UE, or a UE intended to utilize buffered DMRS information for channel estimation to receive a downlink data transmission (e.g., such as third PDSCH communication 718 scheduled for the first UE). For example, the first UE may be a UE capable of performing channel estimation based on DMRS(s) included in a PDSCH scheduled for another UE.

The first UE may buffer DMRS information for DMRS(s) scheduled for other UEs to demodulate and/or decode third PDSCH communication 718. For example, the first UE may buffer DMRS information for (1) DMRS 703(1) included in first PDSCH communication 714, (2) DMRS 703(2) included in first PDSCH communication 714, (3) DMRS 708(1) included in second PDSCH communication 716, and/or (4) DMRS 708(2) included in second PDSCH communication 716. As described herein, in certain aspects, the DMRS information associated with each of DMRS 703(1), 703(2), 708(1), and/or 708(2) and buffered by the first UE may include the corresponding DMRS itself. In certain aspects, the DMRS information associated with DMRS 703(1) and/or 703(2) and buffered by the first UE may include a channel estimate based on DMRS 703(1) and/or 703(2). Further, the DMRS information associated with DMRS 708(1) and/or DMRS 708(2) and buffered by the first UE may include a channel estimate based on DMRS 708(1) and/or DMRS 708(2).

In certain aspects, to enable the first UE to buffer this DMRS information for demodulating and/or decoding third PDSCH communication 718, DCI 702 and/or DCI 706 may be sent to the first UE from a network entity (not shown in FIG. 7). DCI 702, sent to the first UE, may include an indication to buffer first DMRS information associated with DMRS 703(1) and/or DMRS 703(2) scheduled in first PDSCH communication 714. DCI 706, sent to the first UE, may include an indication to buffer second DMRS information associated with DMRS 708(1) and/or DMRS 708(2) scheduled in second PDSCH communication 716.

In certain aspects (e.g., a first option), DCI 702 is a UE-specific DCI intended for the first UE. For example, in certain aspects, DCI 702 may indicate, to the first UE only, to buffer DMRS 703(1) and/or DMRS 703(2) in first PDSCH communication 714. In certain aspects, DCI 702 may indicate, to the first UE only, to buffer a channel estimate based on DMRS 703(1) and/or DMRS 703(2). In this case, DCI 702 may also schedule DMRS 703(1) and DMRS 703(2) in first PDSCH communication 714 (e.g., DCI 702 may not schedule any downlink data transmission, only DMRSs 703(1) and 703(2)).

In certain aspects, DCI 706 is a UE-specific DCI similar to DCI 702. As such, DCI 706, sent as a UE-specific DCI intended for only the first UE, may indicate, to the first UE only, to buffer DMRS 703(1) and/or DMRS 703(2) and/or a channel estimate based on DMRS 703(1) and/or DMRS 703(2).

In certain aspects (e.g., a second option), DCI 702 is a GC-DCI intended for a group of UEs that includes the first UE. For example, UEs may be grouped into one or more groups of UEs (e.g., preconfigured groups) for receiving GC-DCI in a common search space (e.g., search spaces are generally configurations of time-frequency resources where a communications device, such as the group of UEs including first UE 104(1), may look for (e.g., monitor for) control information). Each UE belonging to each group of UEs may be a UE capable of utilizing DMRS(s) from PDSCH communication(s) not scheduled for the UE and transmitted in a prior TTI where the UE does not receive a downlink data transmission. In certain aspects, the group of UEs, including the first UE may be configured with an RNTI common to the group of UEs. DCI 702 may be scrambled by the RNTI such that only UEs in the group are able to decode the DCI and receive the indication to utilize DMRS sharing across UEs. DCI 702, sent as a GC-DCI intended for a group of UEs including the first UE, may indicate, to each UE in the group, to buffer first DMRS information associated with DMRS 703(1) and/or DMRS 703(2) scheduled in first PDSCH communication 714, even though first PDSCH communication 714 is not scheduled for any of the UEs in the group.

In certain aspects, DCI 706 is a GC-DCI similar to DCI 702. As such, DCI 706, sent as a GC-DCI intended for a group of UEs including the first UE, may indicate, to each UE in the group, to buffer first DMRS information associated with DMRS 708(1) and/or DMRS 708(2) scheduled in second PDSCH communication 716, even though second PDSCH communication 716 is not scheduled for any of the UEs in the group.

In certain aspects (e.g., a third option), DCI 702 is a GC-DCI intended for a subgroup of UEs included in a larger (e.g., preconfigured) group of UEs (e.g., configured with a same RNTI). In the example illustrated in FIG. 7, the subgroup may include the first UE.

For example, a subgroup of UEs, for which the GC-DCI is intended, may include UEs that may be scheduled with a same precoder as the GC-DCI in a later PDSCH transmission. As used herein, precoding is a signal processing technique used in wireless communication systems to improve the quality and reliability of data transmission. For example, a network entity may apply a specific precoder to downlink data and/or control signaling transmitted to a UE to help optimize reception of the downlink data and/or control signaling at the receiving UE. Primary objectives of precoding may include maximizing signal-to-noise ratio (SNR), minimizing interference, and/or increasing overall system capacity.

A UE, scheduled to receive a PDSCH communication, may only be able to leverage DMRS(s) sent in a prior TTI for channel estimation to decode the PDSCH communication, if the DMRS(s) are sent using a same precoder as a precoder applied to the PDSCH communication. For example in FIG. 7, the first UE may only leverage DMRS 703(1) and/or DMRS 703(2) if DMRSs 703(1), 703(2) are transmitted using a same precoder as the precoder applied to third PDSCH communication 718. Further, the first UE may only leverage DMRS 708(1) and/or DMRS 708(2) if DMRSs 708(1), 708(2) are transmitted using a same precoder as the precoder applied to third PDSCH communication 718.

As such, aspects described herein propose the use of GC-DCI directed to a subgroup of UEs, of a larger (e.g., preconfigured) group of UEs. The UE(s) in the subgroup may be scheduled to receive PDSCH communications precoded with a same precoder as DMRS(s) for which the subgroup of UEs are instructed to leverage for demodulating and/or decoding their respective PDSCH communications. Different GC-DCI designs may be considered to direct the GC-DCI to a correct subgroup of UEs (e.g., UEs scheduled with a same precoder as the DMRS(s) the GC-DCI is indicating that the UEs exploit).

In a first option, the GC-DCI may include an indication of a subgroup ID associated with a subgroup of UEs intended to receive the GC-DCI (and thus leverage DMRS sharing). For example, UEs, belonging to a group of UEs, may be further grouped into two or more subgroups. Each subgroup may include one or more UEs associated with the group of UEs. Each subgroup may be associated with a unique subgroup ID. A network entity may determine a subgroup ID to include in the GC-DCI based on (1) a precoder selected to be applied to DMRS(s) for which the GC-DCI is indicating to exploit and (2) a precoder associated with the subgroup assigned the subgroup ID.

For example in FIG. 7, a group of UEs may include the first UE and a plurality of other UEs (not shown in FIG. 7). Two subgroups of UEs may also be created for the group of UEs. The first subgroup may be associated with a first precoder (e.g., the first precoder may be applied to PDSCH communications scheduled for UEs belonging to the first subgroup). The second subgroup may be associated with a second precoder (e.g., the second precoder may be applied to PDSCH communications scheduled for UEs belonging to the second subgroup). The first and second precoders may be different. The first UE may be assigned to the first subgroup.

A network entity (not shown in FIG. 7) may determine to apply the first precoder to first PDSCH communication 714 including DMRS 703(1) and DMRS 703(2). To instruct the first UE to leverage DMRS 703(1) and/or DMRS 703(3), given a same precoder used for these DRMSs 703(1), 703(3) is used for scheduling third PDSCH communication 718 for the first UE, network entity may include a subgroup ID uniquely associated with the first subgroup in DCI 702 (e.g., a GC-DCI). The first UE may receive DCI 702 and buffer DMRS information for DMRS 703(1) and/or DMRS 703(2)

based on the subgroup ID for the first subgroup being included in DCI 702. As such, the inclusion of the subgroup ID in DCI 702 may inform the first UE that DMRSs 703(1), 703(2), scheduled by DCI 702, are scheduled using a same precoder used for scheduling data transmission(s) to the first UE.

In a second option, the GC-DCI may include an indication of a precoder index (or multiple precoder indexes) associated with a precoder applied to the DMRS(s) for which the GC-DCI is instructing receiving UE(s) of the GC-DCI to use. For example, UEs, belonging to a (e.g., preconfigured) group of UEs, may be further grouped into two or more subgroups. Each subgroup may include one or more UEs associated with the group of UEs. Each subgroup may be associated with a unique precoder index associated with a precoder applied to PDSCH communication(s) for UEs in the corresponding subgroup. Specifically, a network entity may configure a number of potential precoders and assign each of the precoders a unique precoder index. A network entity may determine a precoder index to include in the GC-DCI based on a precoder selected to be applied to DMRS(s) for which the GC-DCI is indicating to utilize.

For example in FIG. 7, a (e.g., preconfigured) group of UEs may include the first UE and a plurality of other UEs (not shown in FIG. 7). Two subgroups of UEs may also be created for the group of UEs. The first subgroup may be associated with a first precoder index assigned to a first precoder (e.g., the first precoder may be applied to PDSCH communications scheduled for UEs belonging to the first subgroup). The second subgroup may be associated with a second precoder index assigned to a second precoder (e.g., the second precoder may be applied to PDSCH communications scheduled for UEs belonging to the second subgroup). The first UE may be assigned to the first subgroup.

A network entity (not shown in FIG. 7) may determine to apply the first precoder to first PDSCH communication 714 including DMRS 703(1) and DMRS 703(2). As such, DCI 702 (e.g., a GC-DCI) may include the first precoder index assigned to the first precoder, as this is the precoder used for first PDSCH communication 714.

In certain aspects, the first UE may only buffer DMRS(s) with a precoding index matching a precoding index associated with the first subgroup of UEs, for which the first UE belongs. Because the first precoding index is assigned to the first subgroup, the first UE may only buffer DMRS information for DMRS(s) that a GC-DCI, including the first precoder index, indicates to utilize. As such, when the first UE receives DCI 702, including the first precoder (as described above), the first UE may buffer DMRS information for DMRS 703(1) and/or DMRS 703(2) scheduled by DCI 702. The first UE may not buffer DMRS information for DMRS(s) scheduled by GC-DCI that does not include the first precoder index (e.g., includes the second precoder index). Buffering DMRS information for DMRS(s) scheduled by GC-DCI with only the first precoder index, may help to save memory/buffer resources at the UE for buffering DMRS information. Assigning the first UE and other UE(s) belonging to the subgroup with the same precoder index, however, may not be efficient for more mobile UEs. For example, a precoder to use for PDSCH communication(s) with a mobile UE may constantly change as the UE moves, thereby requiring additional overhead to continuously assign the UE to a new subgroup and configure the UE with a precoder index associated with each new subgroup.

In certain other aspects, the first UE may buffer DMRS information for DMRS(s) that a GC-DCI indicates to buffer irrespective of the precoding index included in the CG-DCI. For example, in FIG. 7, the first UE may, when receiving DCI 702 including the first precoder index, buffer DMRS information for DMRS 703(1) and/or 703(2) scheduled by DCI 702, irrespective of the first precoder index being included in DCI 702. The first UE may buffer this DMRS information along with the first precoder index. The first UE may also buffer DMRS information for other DMRS(s) indicated to be utilized via other GC-DCI sent to the first UE including the first precoder index or another precoder index.

The first UE may then receive DCI 710 scheduling third PDSCH communication 718. DCI 710 may include an indication of a precoder index. The precoder index included in DCI 710 may indicate to the first UE which buffered DMRS information is to be used for performing channel estimation to decode third PDSCH communication 718. For example, DCI 710 may include the first precoder index. As such, the first UE may use DMRS information buffered with the first precoder index (and not DMRS information buffered with another precoder index) to determine a channel estimate and decode third PDSCH communication 718.

In certain aspects, the first UE may perform channel estimation to decode third PDSCH communication 718 based on all DMRS information buffered by the first UE. In certain aspects, the first UE may perform channel estimation to decode third PDSCH communication 718 based on a subset of DMRS information buffered by the first UE. In certain aspects, the first UE may perform channel estimation to decode third PDSCH communication 718 based on DMRS information buffered by the first UE and DMRS 712(1) and/or DMRS 712(2) scheduled in third PDSCH communication 718. In certain other aspects, the first UE may perform channel estimation to decode third PDSCH communication 718 based on only DMRS 712(1) and/or DMRS 712(2) scheduled in third PDSCH communication 718, even though DMRS information is buffered at the first UE.

For example, in certain aspects, DCI 710 scheduling third PDSCH communication 718, may include an indication suggesting that the first UE should not perform channel estimation (e.g., for demodulating and/or decoding third PDSCH communication 718) based on buffered DMRS information. Based on receiving this suggestion, the first UE may perform channel estimation using DMRS 712(1) and DMRS 712(2), instead of buffered DMRS information. In certain other aspects, DCI 710 scheduling third PDSCH communication 718, may include an indication suggesting that the first UE should perform channel estimation (e.g., for demodulating and/or decoding third PDSCH communication 718) based on buffered DMRS information. Based on receiving this suggestion, the first UE may perform channel estimation using buffered DMRS information (e.g., all or a subset of the buffered DMRS information), DMRS 712(1), and/or DMRS 712(2). In certain aspects, however, where DCI 710 includes an indication suggesting to perform channel estimation based on buffered DMRS information, using the buffered DMRS information for channel estimation may be based on the first UE implementation and/or capability. In certain aspects, a network entity (not shown in FIG. 7) determines to include the indication suggesting that the first UE perform channel estimation based on buffered DMRS information or not based on a channel condition and/or a DMRS pattern chosen for DMRSs 703(1), 703(2), 708(1), 708(2), 712(1), and/or 712(2). This indication provides a network entity with the ability and flexibility to suggest that the first UE perform channel estimation based on buffered DMRSs or not.

In certain aspects, to enable DMRS sharing across UEs, DCI 702 and/or DCI 706 may include an indication of a transmit power offset. For example, due to different PDSCH power control for the third UE, the second UE and the first UE, the receive power from DMRSs 703(1) and 703(2) in first PDSCH communication 714 may be different than the receive power from DMRSs 708(1) and 708(2) in second PDSCH communication 716, which may also be different than the receive power from DMRSs 712(1) and 712(2) in third PDSCH communication 718. To allow the first UE to combine DMRS 703(1), DMRS 703(2), DMRS 708(1), DMRS 708(2), DMRS 712(1), and/or DMRS 712(2) for channel estimation to decode third PDSCH communication 718, the first UE may perform power normalization.

For example, in certain aspects, the first UE may receive signaling (not shown in FIG. 7) configuring the first UE with an average transmit power per DMRS resource element (RE). In some cases, the signaling may configure only the first UE (e.g., where DCI 702 and/or DCI 706 are UE-specific DCI). In some cases, the signaling may configure a group of UEs, including the first UE (e.g., where DCI 702 and/or DCI 706 are GC-DCI).

In certain aspects, to allow the first UE to utilize DMRS 703(1) and/or DMRS 703(2) for channel estimation, DCI 702 may include an indication of a transmit power offset per DMRS RE with respect to the average transmit power per DMRS RE configured at the first UE. The first UE may use this indication of the transmit power offset per DMRS RE to perform power normalization prior to using DMRS 703(1) and/or DMRS 703(2) for channel estimation. Similarly, in certain aspects, to allow the first UE to utilize DMRS 708(1) and/or DMRS 708(2) for channel estimation, DCI 706 may include an indication of a transmit power offset per DMRS RE with respect to the average transmit power per DMRS RE configured at the first UE.

In certain aspects, the first UE may receive signaling (not shown in FIG. 7) configuring the first UE with an average transmit power per DMRS (instead of per DMRS RE). The signaling may configure only the first UE or configure a group of UEs, including the first UE.

In certain aspects, to allow the first UE to utilize DMRS 703(1) and/or DMRS 703(2) for channel estimation, DCI 702 may include an indication of a transmit power offset per DMRS with respect to the average transmit power per DMRS configured at the first UE. The first UE may use this indication of the transmit power offset per DMRS to perform power normalization prior to using DMRS 703(1) and/or DMRS 703(2) for channel estimation. Similarly, in certain aspects, to allow the first UE to utilize DMRS 708(1) and/or DMRS 708(2) for channel estimation, DCI 706 may include an indication of a transmit power offset per DMRS with respect to the average transmit power per DMRS configured at the first UE.

Based on one or more of the aforementioned techniques, the first UE may demodulate and/or decode third PDSCH communication 718.

Although FIG. 7 depicts an example where a target UE (e.g., the first UE) uses DMRSs transmitted in two past TTIs for two PDSCHs, scheduled for two different UEs, in some other examples, a target UE may use DMRS(s) transmitted in any number (e.g., one or more) of past TTIs for any number (e.g., one or more) PDSCHs. Further, although FIG. 7 depicts the two PDSCHs being associated with two UEs (e.g., the third UE and the second UE), in some other examples the PDSCH(s) may be scheduled for/associated with any number (e.g., one or more) of UEs. Further, if multiple PDSCHs are scheduled, the PDSCHs may be scheduled for a single UE or two or more different UEs.

Example Operations of Entities in a Communications Network

Figure 8:
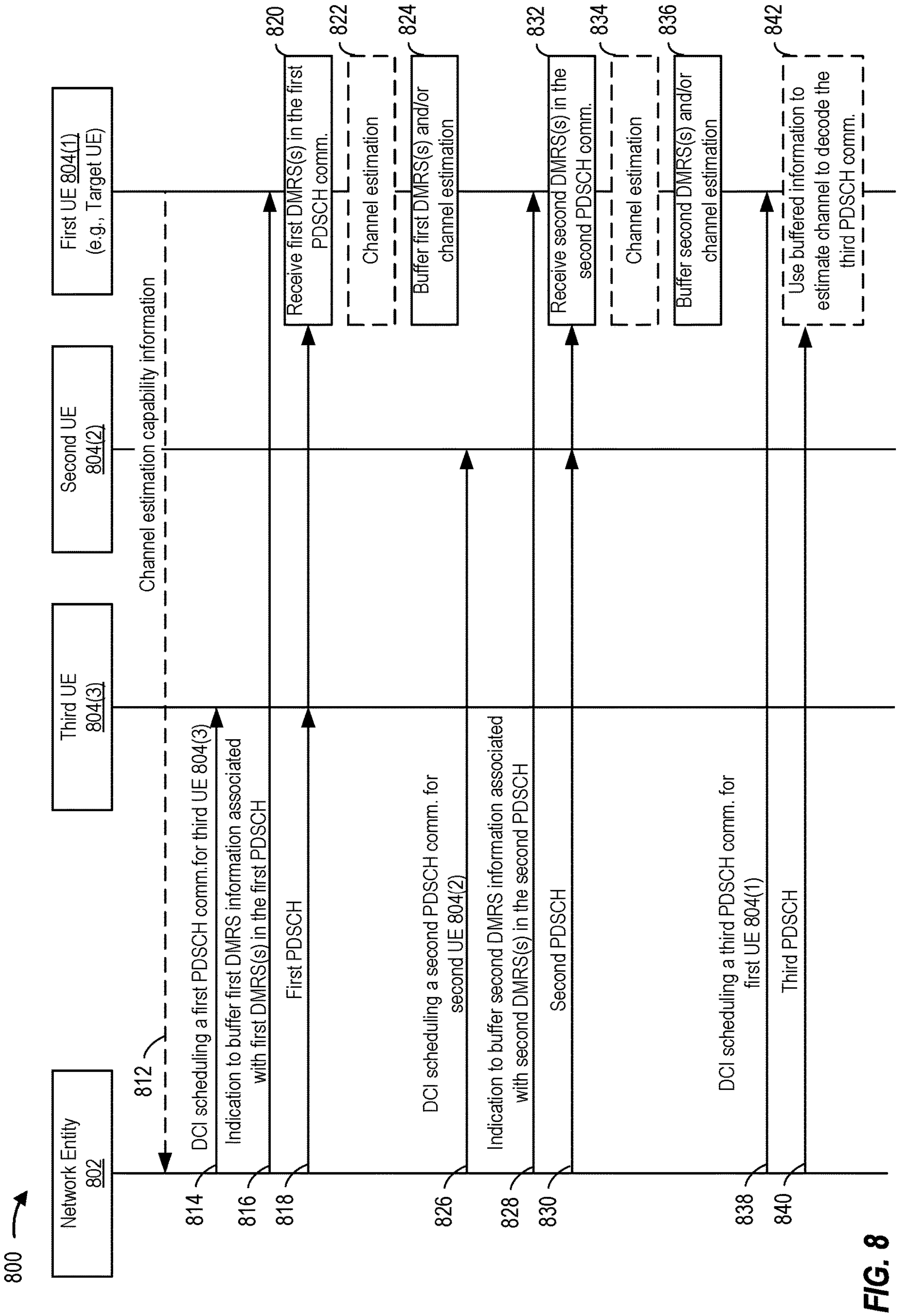
FIG. 8 depicts a process flow for communications in a network between a network entity, a first UE, a second UE, and a third UE to enable the first UE to reuse DMRS(s) included in PDSCH communications scheduled for the second UE and third UE.

FIG. 8 depicts a process flow 800 for communications in a network between a network entity 802, a first UE 804(1), a second UE 804(2), and a third UE 804(3). Communication in process flow 800 may enable first UE 804(1) to reuse DMRS(s) included in PDSCH communications scheduled for second UE 804(2) and third UE 804(3) for estimating a channel to demodulate and/or decode a PDSCH communication scheduled for first UE 804(1). The PDSCH communications scheduled for second UE 804(2) and third UE 804(3) may occur in TTIs earlier in time than a TTI where the PDSCH communication schedule for first UE 804(1) is transmitted.

In certain aspects, the network entity 802 may be an example of the BS 102 depicted and described with respect to FIGS. 1 and 3 or a disaggregated base station depicted and described with respect to FIG. 2. Similarly, first UE 804(1), second UE 804(2), and third UE 804(3) may each be an example of UE 104 depicted and described with respect to FIGS. 1 and 3. However, in other aspects, one or more of first UE 804(1), second UE 804(2), and third UE 804(3) may be another type of wireless communications device and network entity 802 may be another type of network entity or network node, such as those described herein.

Process flow 800 may optionally begin, at 812, with first UE 804(1) sending, and network entity 802 receiving channel estimation capability information for first UE 804(1). The channel estimation capability information may indicate a capability of first UE 804(1) to perform channel estimation based on DMRSs included in a PDSCH scheduled for another UE, such as a PDSCH scheduled for second UE 804(2) and/or a PDSCH scheduled for third UE 804(3).

Process flow 800 proceeds, at 814, with network entity 802 sending, and third UE 804(3) receiving a DCI scheduling a first PDSCH communication for third UE 804(3). One or more first DMRSs may be scheduled in the first PDSCH communication (e.g., as shown for first PDSCH communication 714 and DMRSs 703(1), 703(2) in FIG. 7).

At 816, network entity 802 sends, and first UE 804(1) receives, an indication to buffer first DMRS information associated with one or more first DMRSs that are scheduled in the first PDSCH communication. In certain aspects, the indication is included in a message transmitted as a UE-specific DCI intended only for first UE 804(1). In certain aspects, the indication is included in a message transmitted as a GC-DCI intended for a group of UEs including first UE 804(1).

As described herein, in some aspects, the message including the indication, sent at 816, may further include an indication of a subgroup ID assigned to a subgroup that first UE 804(1) is assigned to (e.g., when first UE 804(1) is assigned to a subgroup), an indication of a precoder index, and/or a transmit power offset, among other information.

In certain aspects, the message including the indication, sent at 816, may include information that may be used by first UE 804(1) for locating the first DMRS(s) in the first PDSCH such that first DMRS information associated with the first DMRS(s) may be buffered at first UE 804(1). For example, the message including the indication, sent at 816, may include an FDRA for the first PDSCH. As another example, the message may include a SLIV indicating a TDRA for the first PDSCH.

In certain aspects, the message sent at 816 further includes an indication that DMRS parameter(s) for the first DMRS(s) are cell-specific or UE-specific. Example DMRS parameter(s) may include a DMRS configuration type parameter (dmrs-Type), a DMRS additional position parameter (dmrs-AdditionalPosition), a DMRS max length parameter (maxLength), a DMRS scrambling ID0 (scramblingID0), a DMRS scrambling ID1 (scramblingID1), and/or a PDSCH mapping type, to name a few.

In cases where the message includes an indication that the DMRS parameter(s) are UE-specific, then the DCI may include one or more of the DMRS parameters. In such cases, the message may schedule the first DMRSs in the first PDSCH.

In some cases where the message includes an indication that the DMRS parameter(s) are cell-specific, then the message may include one or more DMRS parameters. Alternatively, in some cases where the message includes an indication that the DMRS parameter(s) are cell-specific, then the message may not include the DMRS parameters. Instead, first UE 804(1) may derive the DMRS parameter(s) from an MIB or SIB. For example, as described herein, an MIB is carried by the PBCH, which may be logically grouped with a PSS and a SSS to form a SS/PBCH block, and in some cases, referred to as an SSB. The MIB is the first, among other SIBs, which may also be broadcasted by network entity 502. The MIB may be a control channel message transmitted by network entity 802 that may provide necessary information for first UE 804(1) to synchronize with the network and access a cell of network entity 802. Other SIBs may provide other information to first UE 804(1), such as information that may help first UE 804(1) to access a cell, perform cell re-selection, etc.

First UE 804(1) may use the TDRA for the first PDSCH and the DMRS parameter(s) (e.g., including DMRS additional position (dmrs-AdditionalPosition)) to determine a number and the location(s) of the first DMRS(s) in the first PDSCH scheduled for third UE 804(3). Further, first UE 804(1) may use the FDRA for the first PDSCH to determine the frequency resources scheduled for transmitting the first DMRS(s) in the first PDSCH.

Process flow 800 proceeds, at 818, with network entity 802 sending, and third UE 804(3) receiving, the first PDSCH. Further, at 820, first UE 804(1) may receive, in the first PDSCH, the scheduled first DMRS(s).

Process flow 800 proceeds, at 824, with first UE 804(1) buffering first DMRS information associated with the first DMRS(s). In certain aspects, the first DMRS information buffered at first UE 804(1) includes the first DMRS(s) themselves. In certain aspects, the first DMRS information includes a channel estimation based on the first DMRS(s). For example, in certain aspects, at 822, first UE 804(1) may determine a channel estimate based on the first DMRS(s) included in the first PDSCH. In certain aspects, the first DMRS information buffered at first UE 804(1) includes the first DMRS(s) themselves and the channel estimate determined at 822.

As described herein, in some aspects, first UE 804(1) may store a precoder index with the buffered first DMRS information. In some aspects, first UE 804(1) may perform power normalization for the first DMRS(s) prior to buffering the first DMRS information for the first DMRSs.

Process flow 800 proceeds, at 826, with network entity 802 sending, and second UE 804(2) receiving, a DCI scheduling a second PDSCH communication for second UE 804(2). One or more second DMRSs may be scheduled in the second PDSCH communication (e.g., as shown for second PDSCH communication 716 and DMRSs 708(1), 708(2) in FIG. 7).

At 828, network entity 802 sends, and first UE 804(1) receives, an indication to buffer second DMRS information associated with one or more second DMRSs that are scheduled in the second PDSCH communication. In certain aspects, the indication is included in a message transmitted as a UE-specific DCI intended only for second UE 804(1). In certain aspects, the indication is included in a message transmitted as a GC-DCI intended for a group of UEs including second UE 804(1).

In some aspects, the message including the indication, sent at 828, may further include an indication of a subgroup ID assigned to a subgroup that first UE 804(1) is assigned to (e.g., when first UE 804(1) is assigned to a subgroup), an indication of a precoder index, and/or a transmit power offset, among other information.

In certain aspects, the message including the indication, sent at 828, may include information that may be used by first UE 804(1) for locating the second DMRS(s) in the second PDSCH such that second DMRS information associated with the second DMRS(s) may be buffered at first UE 804(1). For example, the message including the indication, sent at 828, may include an FDRA for the second PDSCH, a SLIV indicating a TDRA for the second PDSCH, and an indication that DMRS parameter(s) for the second DMRS(s) are cell-specific or UE-specific. In some cases, the message further includes the DMRS parameter(s).

First UE 804(1) may use the TDRA for the second PDSCH and the DMRS parameter(s) (e.g., including DMRS additional position parameter (dmrs-AdditionalPosition)) to determine a number and the location(s) of the second DMRS(s) in the second PDSCH scheduled for second UE 804(2). Further, first UE 804(1) may use the FDRA for the second PDSCH to determine the frequency resources scheduled for transmitting the second DMRS(s) in the second PDSCH.

Process flow 800 proceeds, at 830, with network entity 802 sending, and second UE 804(2) receiving, the second PDSCH. Further, at 832, first UE 804(1) may receive, in the second PDSCH, the scheduled second DMRS(s).

Process flow 800 proceeds, at 836, with first UE 804(1) buffering second DMRS information associated with the second DMRS(s). In certain aspects, the second DMRS information buffered at first UE 804(1) includes the second DMRS(s) themselves. In certain aspects, the second DMRS information includes a channel estimation based on the second DMRS(s). For example, in certain aspects, at 834 first UE 804(1) may determine a channel estimate based on the second DMRS(s) included in the second PDSCH. In certain aspects, the second DMRS information buffered at first UE 804(1) includes the second DMRS(s) themselves and the channel estimate determined at 834.

In some aspects, first UE 804(1) may store a precoder index with the buffered second DMRS information. In some aspects, first UE 804(1) may perform power normalization for the second DMRS(s) prior to buffering the second DMRS information for the second DMRSs.

Process flow 800 proceeds, at 838, with network entity 802 sending, and first UE 804(1) receiving, a DCI scheduling a third PDSCH communication for first UE 804(1). In certain aspects, one or more third DMRSs may be scheduled in the third PDSCH communication (e.g., as shown for third PDSCH communication 718 and DMRSs 712(1), 712(2) in FIG. 7). In certain aspects, no DMRSs are scheduled in the third PDSCH communication.

Process flow 800 proceeds, at 840, with network entity 802 sending, and first UE 804(1) receiving, the third PDSCH. Further, at 820, first UE 804(1) uses the buffered first and second DMRS information (e.g., buffered at 824 and 842) to perform channel estimation to decode the third PDSCH. For example, in certain aspects, the buffered first and second information includes channel estimates, and these channel estimates may be used to demodulate and/or decode the third PDSCH. In another example, in certain aspects, the buffered first and second information includes first DMRS(s) and second DMRS(s), and these DMRSs are used to estimate the channel, which is then further used to demodulate and/or decode the third PDSCH. In certain aspects where the third PDSCH includes third DMRS(s), these third DMRS(s) may also be used to perform channel estimation to decode the third PDSCH.

Example Operations

Figure 9:
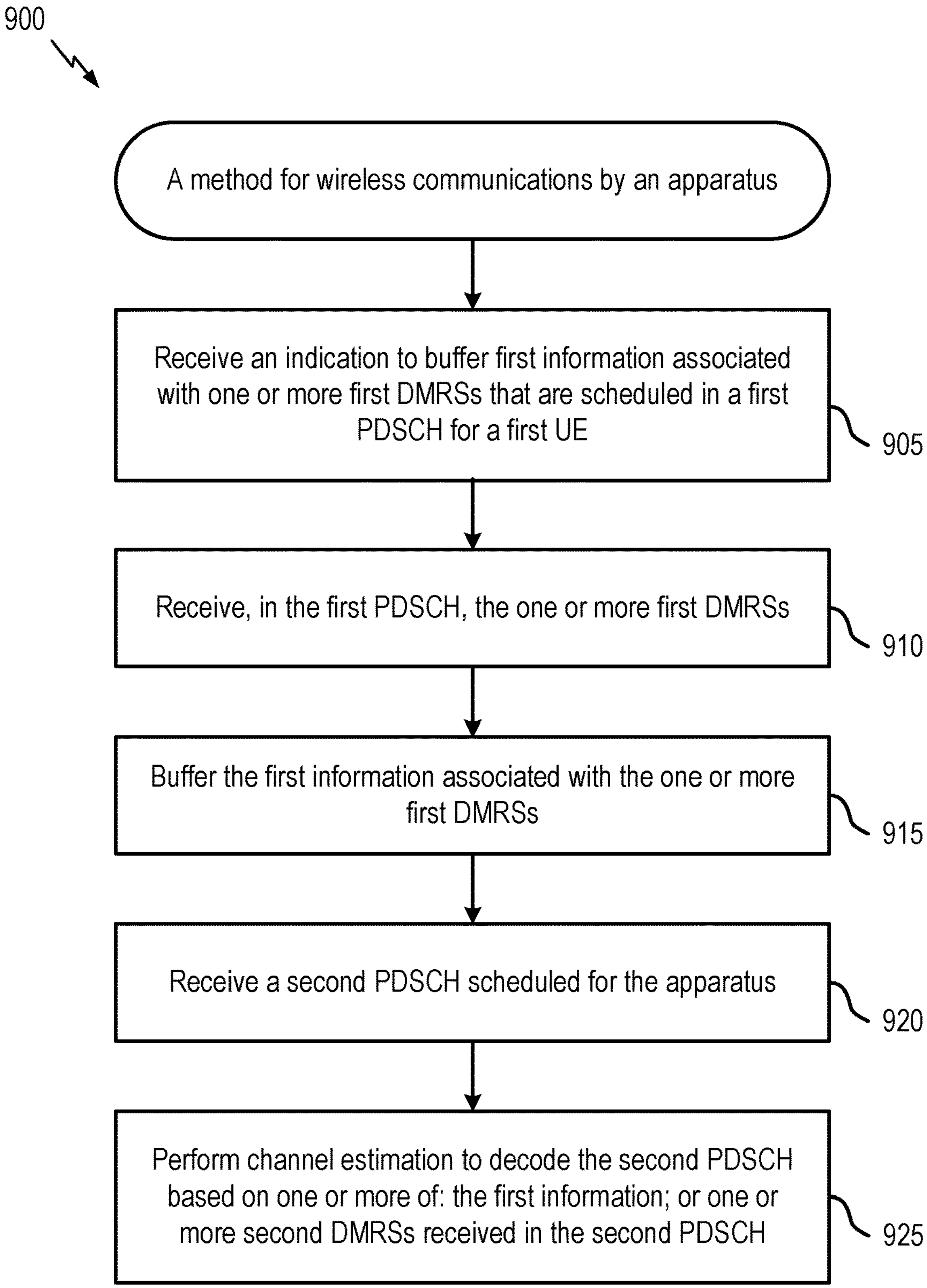
FIG. 9 depicts a method for wireless communications.

FIG. 9 shows a method 900 for wireless communications by an apparatus, such as UE 104 of FIGS. 1 and 3.

Method 900 begins at block 905 with receiving an indication to buffer first information associated with one or more first DMRSs that are scheduled in a first PDSCH for a first UE.

Method 900 then proceeds to block 910 with receiving, in the first PDSCH, the one or more first DMRSs.

Method 900 then proceeds to block 915 with buffering the first information associated with the one or more first DMRSs.

Method 900 then proceeds to block 920 with receiving a second PDSCH scheduled for the apparatus.

Method 900 then proceeds to block 925 with performing channel estimation to decode the second PDSCH based on one or more of: the first information; or one or more second DMRSs received in the second PDSCH.

In certain aspects, block 925 includes performing the channel estimation based on the first information.

In certain aspects, block 925 includes performing the channel estimation based on the one or more second DMRSs.

In certain aspects, the first information comprises one or more of: the one or more first DMRSs; or a channel estimate based on the one or more first DMRSs.

In certain aspects, method 900 further includes sending an indication of a capability of the apparatus to perform channel estimation based on DMRSs included in a PDSCH scheduled for another UE.

In certain aspects, block 905 includes receiving a first message comprising the indication to buffer the first information.

In certain aspects, the first message further comprises: a FDRA for the first PDSCH; a SLIV indicating a TDRA for the first PDSCH; and an indication that one or more DMRS parameters are cell-specific or UE-specific.

In certain aspects, the one or more DMRS parameters comprise at least one of: a DMRS configuration type parameter, a DMRS additional position parameter, a DMRS max length parameter, a DMRS scrambling ID0, a DMRS scrambling ID1, or a PDSCH mapping type.

In certain aspects, the first message comprises the indication that the one or more DMRS parameters are cell-specific; and the method 900 further comprises receiving at least one of a MIB or a SIB indicating the one or more DMRS parameters; or the first message further comprises the one or more DMRS parameters.

In certain aspects, the first message comprises the indication that the one or more DMRS parameters are UE-specific, and the first message further comprises the one or more DMRS parameters.

In certain aspects, method 900 further includes receiving signaling configuring the apparatus with an average transmit power per DMRS RE; and the first message comprises an indication of a transmit power offset per RE with respect to the average transmit power per DMRS RE.

In certain aspects, method 900 further includes receiving signaling configuring the apparatus with a transmit power per DMRS; and the first message comprises an indication of a transmit power offset per DMRS with respect to the transmit power per DMRS.

In certain aspects, the first message comprises a UE-specific DCI intended for the apparatus.

In certain aspects, the first message comprises a GC-DCI intended for a group of UEs that includes the apparatus.

In certain aspects, method 900 further includes receiving a configuration of a first RNTI common to the group of UEs, wherein the first message is scrambled by the first RNTI.

In certain aspects, the apparatus belongs to a first subgroup of the group of UEs, and the first message further comprises an indication of a subgroup ID associated with the first subgroup.

In certain aspects, the first message further comprises an indication of a first precoder index associated with a first precoder applied to the first PDSCH.

In certain aspects, method 900 further includes receiving a second message scheduling the second PDSCH, wherein the second message comprises an indication of the first precoder index; and based on the second message comprising the indication of the first precoder index and the first message comprising the indication of the first precoder index, block 925 includes performing the channel estimation based on the first information.

In certain aspects, method 900 further includes receiving signaling configuring the group of UEs that includes the apparatus with a plurality of precoder indices associated with a plurality of candidate precoders, wherein the plurality of precoder indices include the first precoder index.

In certain aspects, to buffer the first information associated with the one or more first DMRSs is based on the plurality of precoder indices including the first precoder index.

In certain aspects, method 900 further includes receiving a second message scheduling the second PDSCH; and the second message comprises an indication suggesting whether or not to perform the channel estimation based on the first information.

Figure 11:
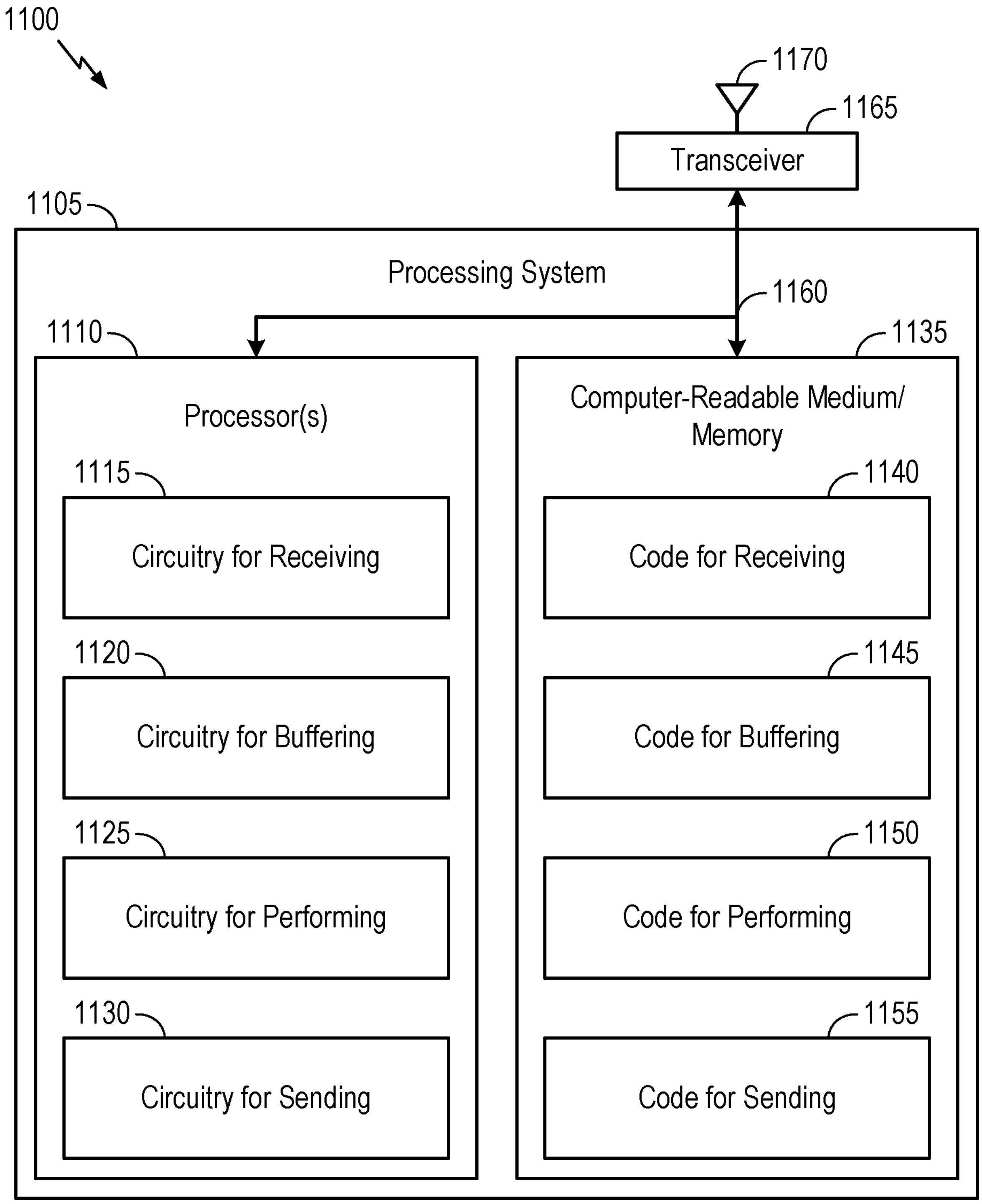
FIG. 11 depicts aspects of an example communications device.

In certain aspects, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative operations are possible consistent with this disclosure.

Figure 10:
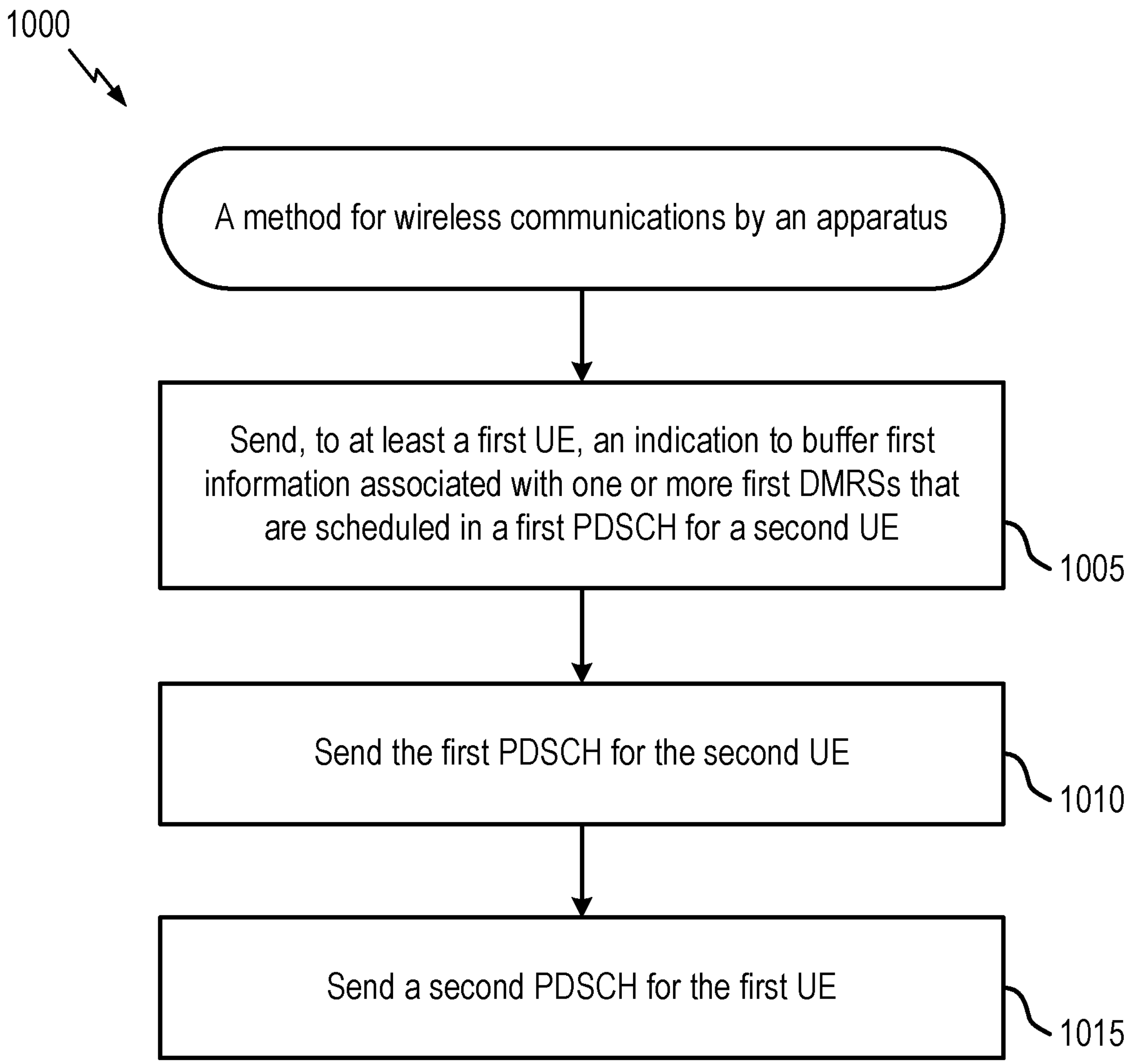
FIG. 10 depicts another method for wireless communications.

FIG. 10 shows a method 1000 for wireless communications by an apparatus, such as BS 102 of FIGS. 1 and 3, or a disaggregated base station as discussed with respect to FIG. 2.

Method 1000 begins at block 1005 with sending, to at least a first UE, an indication to buffer first information associated with one or more first DMRSs that are scheduled in a first PDSCH for a second UE.

Method 1000 then proceeds to block 1010 with sending the first PDSCH for the second UE.

Method 1000 then proceeds to block 1015 with sending a second PDSCH for the first UE.

In certain aspects, the first information comprises one or more of: the one or more first DMRSs; or a channel estimate based on the one or more first DMRSs.

In certain aspects, method 1000 further includes receiving an indication of a capability of the first UE to perform channel estimation based on DMRSs included in a PDSCH scheduled for another UE.

In certain aspects, block 1005 includes sending a first message comprising the indication to buffer the first information.

In certain aspects, the first message further comprises: a FDRA for the first PDSCH; a SLIV indicating a TDRA for the first PDSCH; and an indication that one or more DMRS parameters are cell-specific or UE-specific.

In certain aspects, the one or more DMRS parameters comprise at least one of: a DMRS configuration type parameter, a DMRS additional position parameter, a DMRS max length parameter, a DMRS scrambling ID0, a DMRS scrambling ID1, or a PDSCH mapping type.

In certain aspects, the first message comprises the indication that the one or more DMRS parameters are cell-specific; and the method 1000 further comprises sending at least one of a MIB or a SIB indicating the one or more DMRS parameters; or the first message further comprises the one or more DMRS parameters.

In certain aspects, the first message comprises the indication that the one or more DMRS parameters are UE-specific, and the first message further comprises the one or more DMRS parameters.

In certain aspects, method 1000 further includes sending signaling configuring the first UE with an average transmit power per DMRS RE; and the first message comprises an indication of a transmit power offset per RE with respect to the average transmit power per DMRS RE.

In certain aspects, method 1000 further includes sending signaling configuring the first UE with a transmit power per DMRS; and the first message comprises an indication of a transmit power offset per DMRS with respect to the transmit power per DMRS.

In certain aspects, the first message comprises a UE-specific DCI intended for the first UE.

In certain aspects, the first message comprises a GC-DCI intended for a group of UEs that includes the first UE.

In certain aspects, method 1000 further includes sending a configuration of a first RNTI common to the group of UEs, wherein the first message is scrambled by the first RNTI.

In certain aspects, the first UE belongs to a first subgroup of the group of UEs, and the first message further comprises an indication of a subgroup ID associated with the first subgroup.

In certain aspects, the first message further comprises an indication of a first precoder index associated with a first precoder applied to the first PDSCH.

In certain aspects, method 1000 further includes sending a second message scheduling the second PDSCH, wherein the second message comprises an indication of the first precoder index.

In certain aspects, method 1000 further includes sending signaling configuring the group of UEs that includes the apparatus with a plurality of precoder indices associated with a plurality of candidate precoders, wherein the plurality of precoder indices include the first precoder index.

In certain aspects, method 1000 further includes sending a second message scheduling the second PDSCH; and the second message comprises an indication suggesting whether or not to perform a channel estimation based on the first information.

Figure 12:
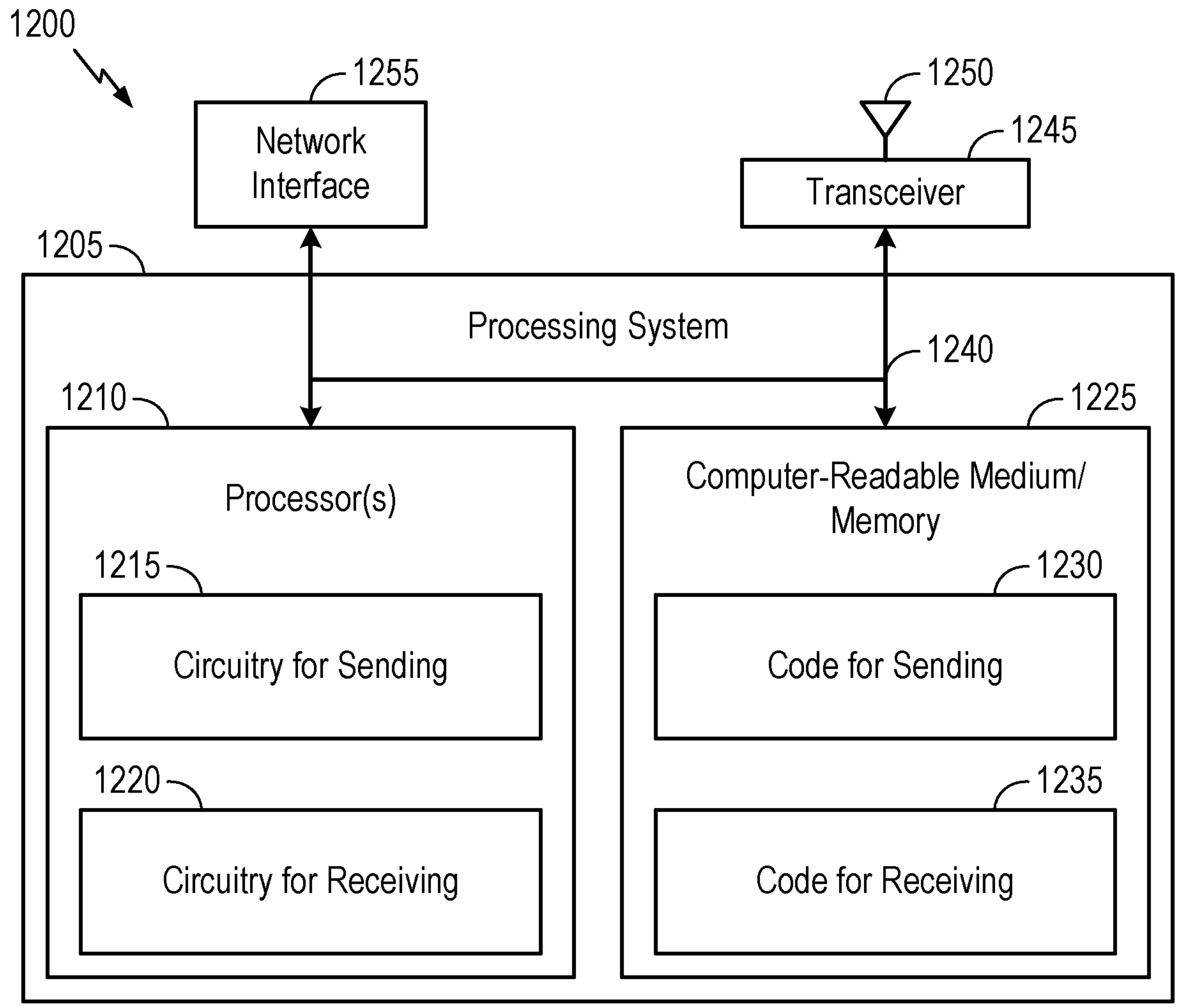
FIG. 12 depicts aspects of an example communications device.

In certain aspects, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative operations are possible consistent with this disclosure.

Example Communications Devices

FIG. 11 depicts aspects of an example communications device 1100. In some aspects, communications device 1100 is a user equipment, such as UE 104 described above with respect to FIGS. 1 and 3.

The communications device 1100 includes a processing system 1105 coupled to a transceiver 1165 (e.g., a transmitter and/or a receiver). The transceiver 1165 is configured to transmit and receive signals for the communications device 1100 via an antenna 1170, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1135 via a bus 1160. In certain aspects, the computer-readable medium/memory 1135 is configured to store instructions (e.g., computer-executable code) that when executed by the one or more processors 1110, enable and cause the one or more processors 1110 to perform the method 900 described with respect to FIG. 9, or any aspect related to it, including any operations described in relation to FIG. 9. Note that reference to a processor performing a function of communications device 1100 may include one or more processors performing that function of communications device 1100, such as in a distributed fashion.

In the depicted example, computer-readable medium/memory 1135 stores code for receiving 1140, code for buffering 1145, code for performing 1150, and code for sending 1155. Processing of the code 1140-1155 may enable and cause the communications device 1100 to perform the method 900 described with respect to FIG. 9, or any aspect related to it.

The one or more processors 1110 include circuitry configured to implement (e.g., execute) the code stored in the computer-readable medium/memory 1135, including circuitry for receiving 1115, circuitry for buffering 1120, circuitry for performing 1125, and circuitry for sending 1130. Processing with circuitry 1115-1130 may enable and cause the communications device 1100 to perform the method 900 described with respect to FIG. 9, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 1165 and/or antenna 1170 of the communications device 1100 in FIG. 11, and/or one or more processors 1110 of the communications device 1100 in FIG. 11. Means for communicating, receiving or obtaining may include the transceivers 354, antenna(s) 352, receive processor 358, AI processor 370, and/or controller/processor 380 of the UE 104 illustrated in FIG. 3, transceiver 1165 and/or antenna 1170 of the communications device 1100 in FIG. 11, and/or one or more processors 1110 of the communications device 1100 in FIG. 11.

FIG. 12 depicts aspects of an example communications device 1200. In some aspects, communications device 1200 is a network entity, such as BS 102 of FIGS. 1 and 3, or a disaggregated base station as discussed with respect to FIG. 2.

The communications device 1200 includes a processing system 1205 coupled to a transceiver 1245 (e.g., a transmitter and/or a receiver) and/or a network interface 1255. The transceiver 1245 is configured to transmit and receive signals for the communications device 1200 via an antenna 1250, such as the various signals as described herein. The network interface 1255 is configured to obtain and send signals for the communications device 1200 via communications link(s), such as a backhaul link, midhaul link, and/or fronthaul link as described herein, such as with respect to FIG. 2. The processing system 1205 may be configured to perform processing functions for the communications device 1200, including processing signals received and/or to be transmitted by the communications device 1200.

The processing system 1205 includes one or more processors 1210. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1225 via a bus 1240. In certain aspects, the computer-readable medium/memory 1225 is configured to store instructions (e.g., computer-executable code) that when executed by the one or more processors 1210, enable and cause the one or more processors 1210 to perform the method 1000 described with respect to FIG. 10, or any aspect related to it, including any operations described in relation to FIG. 10. Note that reference to a processor of communications device 1200 performing a function may include one or more processors of communications device 1200 performing that function, such as in a distributed fashion.

In the depicted example, the computer-readable medium/memory 1225 stores code for sending 1230 and code for receiving 1235. Processing of the code for sending 1230 and the code for receiving 1235 may enable and cause the communications device 1200 to perform the method 1000 described with respect to FIG. 10, or any aspect related to it.

The one or more processors 1210 include circuitry configured to implement (e.g., execute) the code stored in the computer-readable medium/memory 1225, including circuitry for sending 1215 and circuitry for receiving 1220. Processing with circuitry for sending 1215 and circuitry for receiving 1220 may enable and cause the communications device 1200 to perform the method 1000 described with respect to FIG. 10, or any aspect related to it.

More generally, means for communicating, transmitting, sending or outputting for transmission may include the transceivers 332, antenna(s) 334, transmit processor 320, TX MIMO processor 330, AI processor 318, and/or controller/processor 340 of the BS 102 illustrated in FIG. 3, transceiver 1245, antenna 1250, and/or network interface 1255 of the communications device 1200 in FIG. 12, and/or one or more processors 1210 of the communications device 1200 in FIG. 12. Means for communicating, receiving or obtaining may include the transceivers 332, antenna(s) 334, receive processor 338, AI processor 318, and/or controller/processor 340 of the BS 102 illustrated in FIG. 3, transceiver 1245, antenna 1250, and/or network interface 1255 of the communications device 1200 in FIG. 12, and/or one or more processors 1210 of the communications device 1200 in FIG. 12.

Example Clauses

Implementation examples are described in the following numbered clauses:

Clause 1: A method for wireless communications by an apparatus comprising: receiving an indication to buffer first information associated with one or more first DMRSs that are scheduled in a first PDSCH for a first UE; receiving, in the first PDSCH, the one or more first DMRSs; buffering the first information associated with the one or more first DMRSs; receiving a second PDSCH scheduled for the apparatus; and performing channel estimation to decode the second PDSCH based on one or more of: the first information; or one or more second DMRSs received in the second PDSCH.

Clause 2: The method of Clause 1, wherein performing the channel estimation comprises performing the channel estimation based on the first information.

Clause 3: The method of Clause 1, wherein performing the channel estimation comprises performing the channel estimation based on the one or more second DMRSs.

Clause 4: The method of any one of Clauses 1-3, wherein the first information comprises one or more of: the one or more first DMRSs; or a channel estimate based on the one or more first DMRSs.

Clause 5: The method of any one of Clauses 1-4, further comprising: sending an indication of a capability of the apparatus to perform channel estimation based on DMRSs included in a PDSCH scheduled for another UE.

Clause 6: The method of any one of Clauses 1-5, wherein receiving the indication to buffer the first information comprises receiving a first message comprising the indication to buffer the first information.

Clause 7: The method of Clause 6, wherein the first message further comprises: a FDRA for the first PDSCH; a SLIV indicating a TDRA for the first PDSCH; and an indication that one or more DMRS parameters are cell-specific or UE-specific.

Clause 8: The method of Clause 7, wherein the one or more DMRS parameters comprise at least one of: a DMRS configuration type parameter, a DMRS additional position parameter, a DMRS max length parameter, a DMRS scrambling ID0, a DMRS scrambling ID1, or a PDSCH mapping type.

Clause 9: The method of any one of Clauses 7-8, wherein: the first message comprises the indication that the one or more DMRS parameters are cell-specific; and the method further comprises receiving at least one of a MIB or a SIB indicating the one or more DMRS parameters; or the first message further comprises the one or more DMRS parameters.

Clause 10: The method of any one of Clauses 7-8, wherein: the first message comprises the indication that the one or more DMRS parameters are UE-specific, and the first message further comprises the one or more DMRS parameters.

Clause 11: The method of any one of Clauses 6-10, further comprising receiving signaling configuring the apparatus with an average transmit power per DMRS RE; and the first message comprises an indication of a transmit power offset per RE with respect to the average transmit power per DMRS RE.

Clause 12: The method of any one of Clauses 6-10, further comprising receiving signaling configuring the apparatus with a transmit power per DMRS; and the first message comprises an indication of a transmit power offset per DMRS with respect to the transmit power per DMRS.

Clause 13: The method of any one of Clauses 6-12, wherein the first message comprises a UE-specific DCI intended for the apparatus.

Clause 14: The method of any one of Clauses 6-12, wherein the first message comprises a GC-DCI intended for a group of UEs that includes the apparatus.

Clause 15: The method of Clause 14, further comprising: receiving a configuration of a first RNTI common to the group of UEs, wherein the first message is scrambled by the first RNTI.

Clause 16: The method of Clause 14, wherein: the apparatus belongs to a first subgroup of the group of UEs, and the first message further comprises an indication of a subgroup ID associated with the first subgroup.

Clause 17: The method of any one of Clauses 14-16, wherein the first message further comprises an indication of a first precoder index associated with a first precoder applied to the first PDSCH.

Clause 18: The method of Clause 17, further comprising receiving a second message scheduling the second PDSCH, wherein the second message comprises an indication of the first precoder index; and based on the second message comprising the indication of the first precoder index and the first message comprising the indication of the first precoder index, performing the channel estimation comprises performing the channel estimation based on the first information.

Clause 19: The method of Clause 17, further comprising receiving signaling configuring the group of UEs that includes the apparatus with a plurality of precoder indices associated with a plurality of candidate precoders, wherein the plurality of precoder indices include the first precoder index.

Clause 20: The method of Clause 19, wherein: to buffer the first information associated with the one or more first DMRSs is based on the plurality of precoder indices including the first precoder index.

Clause 21: The method of any one of Clauses 1-20, further comprising receiving a second message scheduling the second PDSCH; and the second message comprises an indication suggesting whether or not to perform the channel estimation based on the first information.

Clause 22: A method for wireless communications by an apparatus comprising: sending, to at least a first UE, an indication to buffer first information associated with one or more first DMRSs that are scheduled in a first PDSCH for a second UE; sending the first PDSCH for the second UE; and sending a second PDSCH for the first UE.

Clause 23: The method of Clause 22, wherein the first information comprises one or more of: the one or more first DMRSs; or a channel estimate based on the one or more first DMRSs.

Clause 24: The method of any one of Clauses 22-23, further comprising: receiving an indication of a capability of the first UE to perform channel estimation based on DMRSs included in a PDSCH scheduled for another UE.

Clause 25: The method of any one of Clauses 22-24, wherein sending the indication to buffer the first information comprises sending a first message comprising the indication to buffer the first information.

Clause 26: The method of Clause 25, wherein the first message further comprises: a FDRA for the first PDSCH; a SLIV indicating a TDRA for the first PDSCH; and an indication that one or more DMRS parameters are cell-specific or UE-specific.

Clause 27: The method of Clause 26, wherein the one or more DMRS parameters comprise at least one of: a DMRS configuration type parameter, a DMRS additional position parameter, a DMRS max length parameter, a DMRS scrambling ID0, a DMRS scrambling ID1, or a PDSCH mapping type.

Clause 28: The method of Clause 26, wherein: the first message comprises the indication that the one or more DMRS parameters are cell-specific; and the method further comprises sending at least one of a MIB or a SIB indicating the one or more DMRS parameters; or the first message further comprises the one or more DMRS parameters.

Clause 29: The method of Clause 26, wherein: the first message comprises the indication that the one or more DMRS parameters are UE-specific, and the first message further comprises the one or more DMRS parameters.

Clause 30: The method of Clause 25, further comprising sending signaling configuring the first UE with an average transmit power per DMRS RE; and the first message comprises an indication of a transmit power offset per RE with respect to the average transmit power per DMRS RE.

Clause 31: The method of Clause 25, further comprising sending signaling configuring the first UE with a transmit power per DMRS; and the first message comprises an indication of a transmit power offset per DMRS with respect to the transmit power per DMRS.

Clause 32: The method of Clause 25, wherein the first message comprises a UE-specific DCI intended for the first UE.

Clause 33: The method of Clause 25, wherein the first message comprises a GC-DCI intended for a group of UEs that includes the first UE.

Clause 34: The method of Clause 33, further comprising: sending a configuration of a first RNTI common to the group of UEs, wherein the first message is scrambled by the first RNTI.

Clause 35: The method of Clause 33, wherein: the first UE belongs to a first subgroup of the group of UEs, and the first message further comprises an indication of a subgroup ID associated with the first subgroup.

Clause 36: The method of Clause 33, wherein the first message further comprises an indication of a first precoder index associated with a first precoder applied to the first PDSCH.

Clause 37: The method of Clause 36, further comprising sending a second message scheduling the second PDSCH, wherein the second message comprises an indication of the first precoder index.

Clause 38: The method of Clause 36, further comprising sending signaling configuring the group of UEs that includes the apparatus with a plurality of precoder indices associated with a plurality of candidate precoders, wherein the plurality of precoder indices include the first precoder index.

Clause 39: The method of any one of Clauses 22-38, further comprising sending a second message scheduling the second PDSCH; and the second message comprises an indication suggesting whether or not to perform a channel estimation based on the first information.

Clause 40: One or more apparatuses, comprising: one or more memories comprising executable instructions; and one or more processors configured to execute the executable instructions and cause the one or more apparatuses to perform a method in accordance with any one of Clauses 1-39.

Clause 41: One or more apparatuses, comprising: one or more memories; and one or more processors, coupled to the one or more memories, configured to cause the one or more apparatuses to perform a method in accordance with any one of Clauses 1-39.

Clause 42: One or more apparatuses, comprising: one or more memories; and one or more processors, coupled to the one or more memories, configured to perform a method in accordance with any one of Clauses 1-39.

Clause 43: One or more apparatuses, comprising means for performing a method in accordance with any one of Clauses 1-39.

Clause 44: One or more non-transitory computer-readable media comprising executable instructions that, when executed by one or more processors of one or more apparatuses, cause the one or more apparatuses to perform a method in accordance with any one of Clauses 1-39.

Clause 45: One or more computer program products embodied on one or more computer-readable storage media comprising code for performing a method in accordance with any one of Clauses 1-39.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:

one or more memories; and one or more processors, coupled to the one or more memories, and configured to cause the apparatus to:

receive an indication to buffer first information associated with one or more first demodulation reference signals (DMRSs) that are scheduled in a first physical downlink shared channel (PDSCH) for a first user equipment (UE);

receive, in the first PDSCH, the one or more first DMRSs;

buffer the first information associated with the one or more first DMRSs;

receive a second PDSCH scheduled for the apparatus; and perform channel estimation to decode the second PDSCH based on one or more of:

the first information; or one or more second DMRSs received in the second PDSCH.

2. The apparatus of claim 1, wherein to perform the channel estimation, the one or more processors are configured to cause the apparatus to:

perform the channel estimation based on the first information.

3. The apparatus of claim 1, wherein to perform the channel estimation, the one or more processors are configured to cause the apparatus to:

perform the channel estimation based on the one or more second DMRSs.

4. The apparatus of claim 1, wherein the first information comprises one or more of:

the one or more first DMRSs; or a channel estimate based on the one or more first DMRSs.

5. The apparatus of claim 1, wherein the one or more processors are configured to cause the apparatus to:

send an indication of a capability of the apparatus to perform channel estimation based on DMRSs included in a PDSCH scheduled for another UE.

6. The apparatus of claim 1, wherein to receive the indication to buffer the first information, the one or more processors are configured to cause the apparatus to receive a first message comprising the indication to buffer the first information.

7. The apparatus of claim 6, wherein the first message further comprises:

a frequency domain resource allocation (FDRA) for the first PDSCH;

a start and length indicator value (SLIV) indicating a time domain resource allocation (TDRA) for the first PDSCH; and an indication that one or more DMRS parameters are cell-specific or UE-specific.

8. The apparatus of claim 7, wherein:

the first message comprises the indication that the one or more DMRS parameters are cell-specific; and the one or more processors are configured to cause the apparatus to receive at least one of a master information block (MIB) or a system information block (SIB) indicating the one or more DMRS parameters; or the first message further comprises the one or more DMRS parameters.

9. The apparatus of claim 7, wherein:

the first message comprises the indication that the one or more DMRS parameters are UE-specific, and the first message further comprises the one or more DMRS parameters.

10. The apparatus of claim 6, wherein:

the one or more processors are configured to cause the apparatus to receive signaling configuring the apparatus with an average transmit power per DMRS resource element (RE); and the first message comprises an indication of a transmit power offset per RE with respect to the average transmit power per DMRS RE.

11. The apparatus of claim 6, wherein:

the one or more processors are configured to cause the apparatus to receive signaling configuring the apparatus with a transmit power per DMRS; and the first message comprises an indication of a transmit power offset per DMRS with respect to the transmit power per DMRS.

12. The apparatus of claim 6, wherein the first message comprises a UE-specific DCI intended for the apparatus.

13. The apparatus of claim 6, wherein the first message comprises a group common-DCI (GC-DCI) intended for a group of UEs that includes the apparatus.

14. The apparatus of claim 13, wherein the one or more processors are configured to cause the apparatus to:

receive a configuration of a first radio network temporary identifier (RNTI) common to the group of UEs, wherein the first message is scrambled by the first RNTI.

15. The apparatus of claim 13, wherein:

the apparatus belongs to a first subgroup of the group of UEs, and the first message further comprises an indication of a subgroup identifier (ID) associated with the first subgroup.

16. The apparatus of claim 13, wherein:

the first message further comprises an indication of a first precoder index associated with a first precoder applied to the first PDSCH, and the one or more processors are configured to cause the apparatus to receive a second message scheduling the second PDSCH, wherein the second message comprises an indication of the first precoder index; and based on the second message comprising the indication of the first precoder index and the first message comprising the indication of the first precoder index, to perform the channel estimation, the one or more processors are configured to cause the apparatus to perform the channel estimation based on the first information.

17. The apparatus of claim 14, wherein:

the one or more processors are configured to cause the apparatus to receive signaling configuring the group of UEs that includes the apparatus with a plurality of precoder indices associated with a plurality of candidate precoders, the plurality of precoder indices include a first precoder index, the first message further comprises an indication of a first precoder index associated with a first precoder applied to the first PDSCH, and to buffer the first information associated with the one or more first DMRSs is based on the plurality of precoder indices including the first precoder index.

18. The apparatus of claim 1, wherein;

the one or more processors are configured to cause the apparatus to receive a second message scheduling the second PDSCH; and the second message comprises an indication suggesting whether or not to perform the channel estimation based on the first information.

19. A method for wireless communications by an apparatus comprising:

receiving an indication to buffer first information associated with one or more first demodulation reference signals (DMRSs) that are scheduled in a first physical downlink shared channel (PDSCH) for a first user equipment (UE);

receiving, in the first PDSCH, the one or more first DMRSs;

buffering the first information associated with the one or more first DMRSs;

receiving a second PDSCH scheduled for the apparatus; and performing channel estimation to decode the second PDSCH based on one or more of:

the first information; or one or more second DMRSs received in the second PDSCH.

20. The method of claim 19, wherein performing the channel estimation comprises performing the channel estimation based on the first information.

21. The method of claim 19, wherein performing the channel estimation comprises performing the channel estimation based on the one or more second DMRSs.

22. The method of claim 19, wherein the first information comprises one or more of:

the one or more first DMRSs; or a channel estimate based on the one or more first DMRSs.

23. The method of claim 19, wherein the method comprises:

sending an indication of a capability of the apparatus to perform channel estimation based on DMRSs included in a PDSCH scheduled for another UE.

24. The method of claim 19, wherein receiving the indication to buffer the first information comprises receiving a first message comprising the indication to buffer the first information.

25. The method of claim 24, wherein the first message further comprises:

a frequency domain resource allocation (FDRA) for the first PDSCH;

a start and length indicator value (SLIV) indicating a time domain resource allocation (TDRA) for the first PDSCH; and an indication that one or more DMRS parameters are cell-specific or UE-specific.

26. The method of claim 25, wherein:

the first message comprises the indication that the one or more DMRS parameters are cell-specific; or the first message further comprises the one or more DMRS parameters.

27. The method of claim 24, wherein:

the method comprises receiving signaling configuring the apparatus with an average transmit power per DMRS resource element (RE), and the first message comprises an indication of a transmit power offset per RE with respect to the average transmit power per DMRS RE, and the method comprises receiving signaling configuring the apparatus with a transmit power per DMRS, and the first message comprises an indication of a transmit power offset per DMRS with respect to the transmit power per DMRS.

28. The method of claim 24, wherein the first message comprises a UE-specific DCI intended for the apparatus, or the first message comprises a group common-DCI (GC-DCI) intended for a group of UEs that includes the apparatus.

29. The method of claim 28, wherein the first message comprises a group common-DCI (GC-DCI) intended for a group of UEs that includes the apparatus, and wherein:

the method comprises receiving a configuration of a first radio network temporary identifier (RNTI) common to the group of UEs, wherein the first message is scrambled by the first RNTI; or the apparatus belongs to a first subgroup of the group of UEs, and the first message further comprises an indication of a subgroup identifier (ID) associated with the first subgroup; or the first message further comprises an indication of a first precoder index associated with a first precoder applied to the first PDSCH, the method comprises receiving a second message scheduling the second PDSCH, wherein the second message comprises an indication of the first precoder index, and based on the second message comprising the indication of the first precoder index and the first message comprising the indication of the first precoder index, the performing comprises performing the channel estimation based on the first information.

30. The method of claim 19, wherein the method comprises:

receiving a second message scheduling the second PDSCH, wherein the second message comprises an indication suggesting whether or not to perform the channel estimation based on the first information.

* * * * *